(12) United States Patent
Lin et al.

(10) Patent No.: US 11,798,307 B2
(45) Date of Patent: Oct. 24, 2023

(54) UNDER-DISPLAY ULTRASONIC FINGERPRINT SENSORS FOR FOLDABLE DISPLAYS

(71) Applicant: QUALCOMM Incorporated, San Diego, CA (US)

(72) Inventors: Shiang-Chi Lin, Taoyuan (TW); Hrishikesh Vijaykumar Panchawagh, Cupertino, CA (US); Jessica Liu Strohmann, Cupertino, CA (US); Yipeng Lu, Davis, CA (US); Chin-Jen Tseng, Fremont, CA (US); Kostadin Dimitrov Djordjev, Los Gatos, CA (US); Min-Lun Yang, Miaoli County (TW); Chia-Wei Yang, Hsinchu (TW)

(73) Assignee: QUALCOMM Incorporated, San Diego, CA (US)

( * ) Notice: Subject to any disclaimer, the term of this patent is extended or adjusted under 35 U.S.C. 154(b) by 23 days.

(21) Appl. No.: 17/446,436

(22) Filed: Aug. 30, 2021

(65) Prior Publication Data

US 2023/0063693 A1 Mar. 2, 2023

(51) Int. Cl.
*G06V 40/13* (2022.01)
*G01S 7/52* (2006.01)
*G06F 21/32* (2013.01)

(52) U.S. Cl.
CPC ...... *G06V 40/1306* (2022.01); *G01S 7/52079* (2013.01); *G06F 21/32* (2013.01)

(58) Field of Classification Search
None
See application file for complete search history.

(56) References Cited

U.S. PATENT DOCUMENTS

| 10,055,031 B2 | 8/2018 | Park et al. |
| 10,719,682 B2 | 7/2020 | Choi et al. |

(Continued)

FOREIGN PATENT DOCUMENTS

| EP | 2765622 B1 | 6/2018 |
| EP | 3651004 A1 | 5/2020 |

(Continued)

OTHER PUBLICATIONS

International Search Report and Written Opinion—PCT/US2022/073482—ISA/EPO—dated Oct. 31, 2022.

*Primary Examiner* — Nicholas J Lee
(74) *Attorney, Agent, or Firm* — QUALCOMM Incorporated

(57) ABSTRACT

An apparatus may include an ultrasonic sensor stack, a foldable display stack and a transmission enhancement layer. The foldable display stack may include a display stiffener and display stack layers. The display stack layers may form one or more display stack resonators configured to enhance ultrasonic waves transmitted by the ultrasonic sensor stack in a first ultrasonic frequency range. In some implementations, a transmission enhancement resonator may include the display stiffener and the transmission enhancement layer. In some examples, the transmission enhancement resonator may include at least a portion of the ultrasonic sensor stack. The transmission enhancement resonator may be configured to enhance the ultrasonic waves transmitted by the ultrasonic sensor stack in the first ultrasonic frequency range.

31 Claims, 9 Drawing Sheets

(56) References Cited

U.S. PATENT DOCUMENTS

| | | |
|---|---|---|
| 11,080,502 B2 | 8/2021 | Lee et al. |
| 2018/0373913 A1* | 12/2018 | Panchawagh ....... G01S 15/8925 |
| 2019/0325185 A1 | 10/2019 | Tang |
| 2020/0125815 A1 | 4/2020 | Lu et al. |
| 2020/0356196 A1* | 11/2020 | Strohmann ........... G01S 15/899 |

FOREIGN PATENT DOCUMENTS

| | | |
|---|---|---|
| WO | WO2014197504 A1 | 12/2014 |
| WO | WO2015127335 A2 | 8/2015 |
| WO | WO2017218228 A1 | 12/2017 |

* cited by examiner

800

| 805 | Controlling, via a control system, an ultrasonic transceiver layer of an ultrasonic sensor system to transmit ultrasonic waves through at least a first resonator configured for causing a first local maximum of ultrasonic wave transmission in a first ultrasonic frequency range and a second resonator configured for causing a second local maximum of ultrasonic wave transmission in the first ultrasonic frequency range, the first resonator including a display stiffener layer and a transmission enhancement layer, the second resonator including one or more display stack layers |

Receiving, by the control system and from the ultrasonic sensor system, ultrasonic sensor signals corresponding to reflections of transmitted ultrasonic waves from a portion of a target object positioned on an outer surface of an apparatus that includes the ultrasonic sensor system — 810

Performing, by the control system, an authentication process based, at least in part, on the ultrasonic sensor signals — 815

*Figure 8*

UNDER-DISPLAY ULTRASONIC FINGERPRINT SENSORS FOR FOLDABLE DISPLAYS

TECHNICAL FIELD

This disclosure relates generally to sensor devices and related methods, including but not limited to ultrasonic sensor systems and methods for using such systems.

DESCRIPTION OF THE RELATED TECHNOLOGY

Biometric authentication can be an important feature for controlling access to devices, etc. Many existing products include some type of biometric authentication. Although some existing biometric authentication technologies provide satisfactory performance, improved methods and devices would be desirable.

SUMMARY

The systems, methods and devices of the disclosure each have several innovative aspects, no single one of which is solely responsible for the desirable attributes disclosed herein.

One innovative aspect of the subject matter described in this disclosure may be implemented in an apparatus. The apparatus may include an ultrasonic sensor stack, a foldable display stack and a transmission enhancement layer. The foldable display stack may, in some examples, include a display stiffener and display stack layers configured to cause ultrasonic waves transmitted by the ultrasonic sensor stack to have one or more display stack-induced local amplitude maxima in a first ultrasonic frequency range. In some examples, the display stiffener and the transmission enhancement layer may form at least part of a transmission enhancement resonator. The transmission enhancement resonator may, in some implementations, be configured to cause the ultrasonic waves transmitted by the ultrasonic sensor stack to have a transmission enhancement resonator-induced local amplitude maximum in the first ultrasonic frequency range.

According to some implementations, the apparatus may be a mobile device. The mobile device may include the ultrasonic sensor stack, the foldable display stack and the transmission enhancement layer.

In some examples, the transmission enhancement resonator-induced local amplitude maximum may correspond to a frequency in the range from 5 MHz to 15 MHz. In other examples, the transmission enhancement resonator-induced local amplitude maximum may correspond to a frequency in the range from 1 MHz to 20 MHz. In some examples, the transmission enhancement resonator may have a thickness corresponding to a multiple of a half wavelength of a shear wave or a longitudinal wave having a frequency in the first ultrasonic frequency range.

According to some examples, at least some of the display stack layers may include (and/or may form) one or more display stack resonators. In some such examples, the one or more display stack resonators may be configured to cause the one or more display stack-induced local amplitude maxima. In some examples, the one or more display stack resonators may include a first resonator bounded by the display stiffener and a glass layer of the foldable display stack. According to some such examples, the first resonator may include a plurality of layers of an organic light-emitting diode display. In some examples, the one or more display stack resonators may include a second resonator bounded by the glass layer and an outer surface of the foldable display stack.

In some examples, the transmission enhancement layer may reside between the ultrasonic sensor stack and the display stiffener. According to some examples, the transmission enhancement layer may have a thickness of less than a quarter wavelength of a shear wave or a longitudinal wave having a frequency in the first ultrasonic frequency range. In some implementations, the transmission enhancement layer may be, or may include, one or more of an aluminum layer having an aluminum layer thickness in a range from 50 microns to 100 microns, a copper layer having a copper layer thickness in a range from 25 microns to 50 microns or a stainless steel layer having a stainless steel layer thickness in the range from 25 microns to 50 microns. According to some examples, the transmission enhancement layer may include at least a portion of the ultrasonic sensor stack.

According to some implementations, the apparatus may include a first adhesive layer residing between the transmission enhancement layer and the display stiffener. In some implementations, the apparatus may include a second adhesive layer residing between the transmission enhancement layer and the ultrasonic sensor stack. According to some examples, the first adhesive layer and/or the second adhesive layer may have a thickness in the range from 3 microns to 10 microns.

In some examples, the ultrasonic sensor stack may include a thin-film transistor (TFT) substrate. According to some such examples, the transmission enhancement resonator may include the TFT substrate. In some instances, the TFT substrate may have a thickness of less than a quarter wavelength of a shear wave or a longitudinal wave having a frequency in the first ultrasonic frequency range. In some examples, the TFT substrate may have a thickness in a range from 50 microns to 200 microns. According to some examples, the TFT substrate may be made of, or may include, glass.

According to some implementations, the TFT substrate may have a first acoustic impedance value. In some such examples, the display stiffener may have a second acoustic impedance value that is greater than the first acoustic impedance value. In some examples, the transmission enhancement layer may have a third acoustic impedance value that is greater than the first acoustic impedance value.

According to some examples, the display stiffener may be, or may include, one or more of a metal layer or a non-metal layer having an acoustic impedance of 10 MRayls or more. In some examples, the display stiffener may have a thickness in a range from 30 microns to 300 microns. According to some examples, the display stiffener may have a thickness corresponding to a multiple of a half wavelength of a shear wave or a longitudinal wave having a frequency in a second ultrasonic frequency range that is higher than the first ultrasonic frequency range.

In some implementations, the apparatus may include a control system. The control system may include one or more general purpose single- or multi-chip processors, digital signal processors (DSPs), application specific integrated circuits (ASICs), field programmable gate arrays (FPGAs) or other programmable logic devices, discrete gates or transistor logic, discrete hardware components, or combinations thereof. According to some examples, the control system may be configured to cause the ultrasonic sensor stack to transmit first ultrasonic waves in the first ultrasonic frequency range and to perform an authentication process based, at least in part, on ultrasonic sensor signals corresponding to reflections of the first ultrasonic waves.

Other innovative aspects of the subject matter described in this disclosure may be implemented in a method. In some examples, the method may involve controlling, via a control system, an ultrasonic transceiver layer of an ultrasonic sensor system to transmit ultrasonic waves through at least a first resonator configured for causing a first local maximum of ultrasonic wave transmission in a first ultrasonic frequency range and a second resonator configured for causing a second local maximum of ultrasonic wave transmission in the first ultrasonic frequency range. In some examples, the first resonator may include a display stiffener layer and a transmission enhancement layer. In some instances, the second resonator may include one or more display stack layers.

In some examples, the method may involve receiving, by the control system and from the ultrasonic sensor system, ultrasonic sensor signals corresponding to reflections of transmitted ultrasonic waves from a portion of a target object positioned on an outer surface of an apparatus that includes the ultrasonic sensor system. According to some examples, the method may involve performing, by the control system, an authentication process based, at least in part, on the ultrasonic sensor signals.

According to some implementations, the local maximum of ultrasonic wave transmission may correspond to a frequency in a range from 5 MHz to 15 MHz. However, in other implementations, the local maximum of ultrasonic wave transmission may correspond to a frequency in a range from 1 MHz to 20 MHz.

In some examples, the authentication process may involve extracting target object features from the ultrasonic sensor signals. The target object features may, for example include fingerprint features and/or sub-epidermal features. In some examples, the method may involve controlling access to the apparatus based, at least in part, on the authentication process.

Some or all of the operations, functions and/or methods described herein may be performed by one or more devices according to instructions (e.g., software) stored on one or more non-transitory media. Such non-transitory media may include memory devices such as those described herein, including but not limited to random access memory (RAM) devices, read-only memory (ROM) devices, etc. Accordingly, some innovative aspects of the subject matter described in this disclosure can be implemented in one or more non-transitory media having software stored thereon.

For example, the software may include instructions for controlling one or more devices to perform a method. According to some examples, the method may involve controlling, via a control system, an ultrasonic transceiver layer of an ultrasonic sensor system to transmit ultrasonic waves through at least a first resonator configured for causing a first local maximum of ultrasonic wave transmission in a first ultrasonic frequency range and a second resonator configured for causing a second local maximum of ultrasonic wave transmission in the first ultrasonic frequency range. In some examples, the first resonator may include a display stiffener layer and a transmission enhancement layer. In some instances, the second resonator may include one or more display stack layers.

In some examples, the method may involve receiving, by the control system and from the ultrasonic sensor system, ultrasonic sensor signals corresponding to reflections of transmitted ultrasonic waves from a portion of a target object positioned on an outer surface of an apparatus that includes the ultrasonic sensor system. According to some examples, the method may involve performing, by the control system, an authentication process based, at least in part, on the ultrasonic sensor signals.

According to some implementations, the local maximum of ultrasonic wave transmission may correspond to a frequency in a range from 5 MHz to 15 MHz. However, in other implementations, the local maximum of ultrasonic wave transmission may correspond to a frequency in a range from 1 MHz to 20 MHz.

In some examples, the authentication process may involve extracting target object features from the ultrasonic sensor signals. The target object features may, for example include fingerprint features and/or sub-epidermal features. In some examples, the method may involve controlling access to the apparatus based, at least in part, on the authentication process.

BRIEF DESCRIPTION OF THE DRAWINGS

Details of one or more implementations of the subject matter described in this specification are set forth in the accompanying drawings and the description below. Other features, aspects, and advantages will become apparent from the description, the drawings, and the claims. Note that the relative dimensions of the following figures may not be drawn to scale. Like reference numbers and designations in the various drawings indicate like elements.

FIG. 8 is a flow diagram that provides examples of operations according to some disclosed methods.

DETAILED DESCRIPTION

Figure 1:
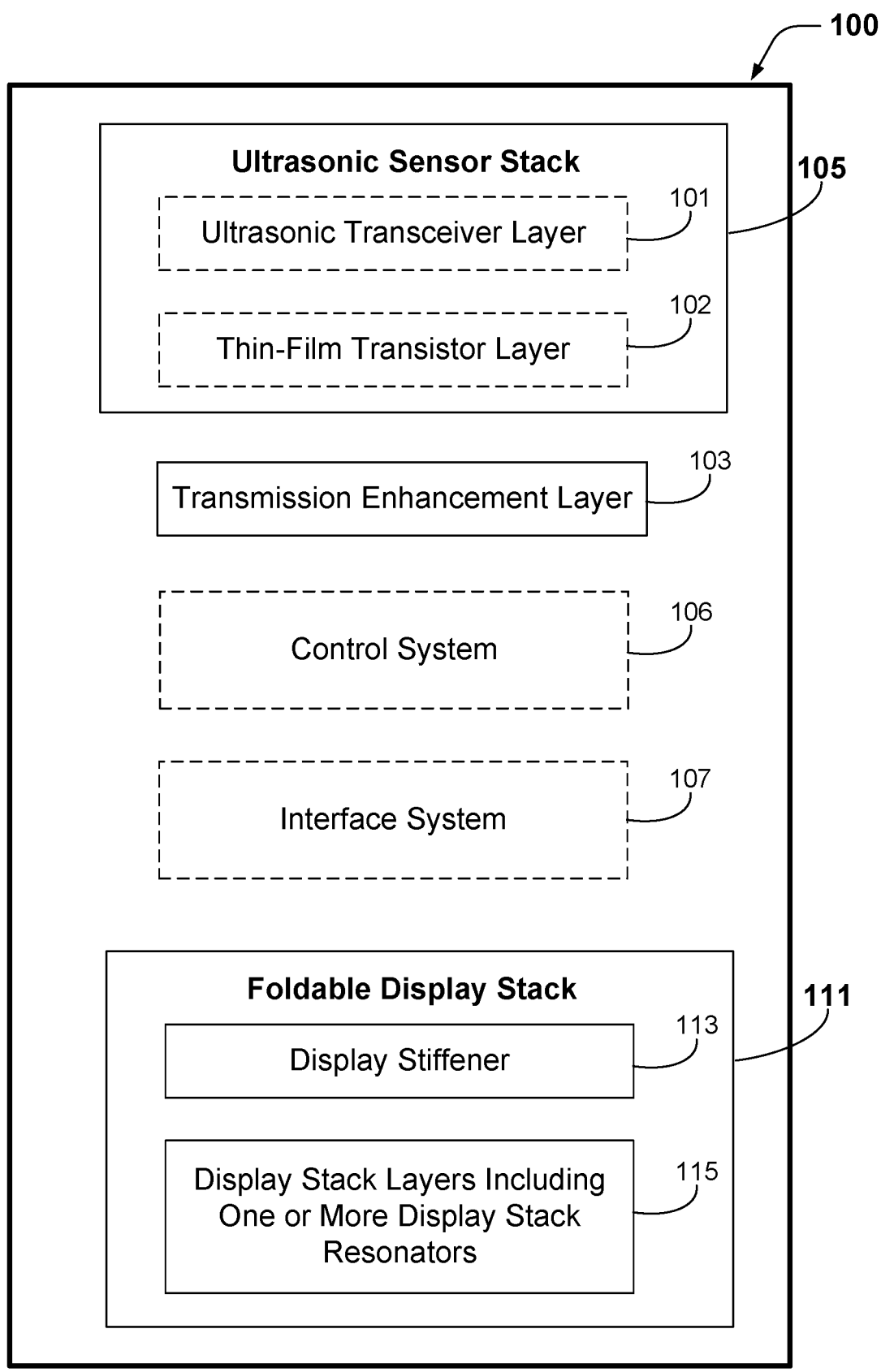
FIG. 1 is a block diagram that shows example components of an apparatus according to some disclosed implementations.

The following description is directed to certain implementations for the purposes of describing the innovative aspects of this disclosure. However, a person having ordinary skill in the art will readily recognize that the teachings herein may be applied in a multitude of different ways. The described implementations may be implemented in any device, apparatus, or system that includes a biometric system as disclosed herein. In addition, it is contemplated that the described implementations may be included in or associated with a variety of electronic devices such as, but not limited to: mobile telephones, multimedia Internet enabled cellular telephones, mobile television receivers, wireless devices, smartphones, smart cards, wearable devices such as bracelets, armbands, wristbands, rings, headbands, patches, etc., Bluetooth® devices, personal data assistants (PDAs), wireless electronic mail receivers, hand-held or portable computers, netbooks, notebooks, smartbooks, tablets, printers, copiers, scanners, facsimile devices, global positioning system (GPS) receivers/navigators, cameras, digital media players (such as MP3 players), camcorders, game consoles, wrist watches, clocks, calculators, television monitors, flat panel displays, electronic reading devices (e.g., e-readers), mobile health devices, computer monitors, auto displays (including odometer and speedometer displays, etc.), cockpit controls and/or displays, camera view displays (such as the display of a rear view camera in a vehicle), electronic photographs, electronic billboards or signs, projectors, architectural structures, microwaves, refrigerators, stereo systems, cassette recorders or players, DVD players, CD players, VCRs, radios, portable memory chips, washers, dryers, washer/dryers, parking meters, packaging (such as in electromechanical systems (EMS) applications including microelectromechanical systems (MEMS) applications, as well as non-EMS applications), aesthetic structures (such as display of images on a piece of jewelry or clothing) and a variety of EMS devices. The teachings herein also may be used in applications such as, but not limited to, electronic switching devices, radio frequency filters, sensors, accelerometers, gyroscopes, motion-sensing devices, magnetometers, inertial components for consumer electronics, parts of consumer electronics products, steering wheels or other automobile parts, varactors, liquid crystal devices, electrophoretic devices, drive schemes, manufacturing processes and electronic test equipment. Thus, the teachings are not intended to be limited to the implementations depicted solely in the Figures, but instead have wide applicability as will be readily apparent to one having ordinary skill in the art.

It is challenging to design an under-display ultrasonic sensor system that provides acceptable performance. However, the present assignee has successfully designed under-display ultrasonic sensor systems that are widely deployed in cell phones and other display devices.

Designing an under-display ultrasonic sensor system for foldable display devices presents additional challenges. A foldable display includes a display stiffener, which helps to maintain the physical integrity of the display stack when the foldable display is folded and unfolded. The display stiffener is usually made from metal having a thickness in the range of approximately 30 microns to 300 microns, though display stiffeners also may be formed of other material(s) having a relatively high modulus of elasticity and may, in some instances, have other thicknesses. The present inventors have found that display stiffeners severely attenuate ultrasonic waves in frequency ranges that are suitable for ultrasonic fingerprint sensors.

Some disclosed foldable display devices include an ultrasonic sensor stack, a transmission enhancement layer and a foldable display stack having a display stiffener. In some examples, the display stiffener, the transmission enhancement layer and at least a portion of the ultrasonic sensor stack form a transmission enhancement resonator that is configured to enhance the ultrasonic waves transmitted by the ultrasonic sensor stack in an ultrasonic frequency range that is suitable for ultrasonic fingerprint sensors.

Particular implementations of the subject matter described in this disclosure may be implemented to realize one or more of the following potential advantages. Some disclosed foldable display devices have enhanced transmission of ultrasonic waves in an ultrasonic frequency range that is suitable for ultrasonic fingerprint sensors, as compared to the transmission of ultrasonic waves of foldable display devices that lack some version of the disclosed transmission enhancement layer. Implementations wherein the transmission enhancement layer resides between an ultrasonic sensor stack and a display stiffener may be manufactured without modifying the existing foldable display stack, thereby avoiding additional manufacturing cost and time.

FIG. 1 is a block diagram that shows example components of an apparatus according to some disclosed implementations. As with other disclosed implementations, the numbers, types and arrangements of elements shown in FIG. 1 are merely presented by way of example. Although not shown in FIG. 1, the apparatus 100 may include other components, such as a cover (which may be, or may include, a cover glass), one or more adhesive layers, one or more electrode layers, etc. Some examples are described below. In some implementations, the apparatus 100 may be a mobile device that includes the elements shown in FIG. 1.

According to this example, the apparatus 100 includes an ultrasonic sensor stack 105. In some examples, the ultrasonic sensor stack 105 includes an ultrasonic transceiver layer 101 and a thin-film transistor (TFT) layer 102. In some such examples, the ultrasonic transceiver layer 101 may be configured to function as both an ultrasonic transmitter and an ultrasonic receiver. According to some implementations, the ultrasonic transceiver layer 101 may be a single piezoelectric layer, whereas in other implementations the ultrasonic transceiver layer 101 may be a multilayer piezoelectric structure, or an array of such structures.

For example, in some implementations, the ultrasonic transceiver layer 101 may include a piezoelectric layer, such as a layer of PVDF polymer or a layer of PVDF-TrFE copolymer. In some implementations, other piezoelectric materials may be used in the ultrasonic transceiver layer 101, such as aluminum nitride (AlN) or lead zirconate titanate (PZT). Some alternative implementations may include separate ultrasonic transmitter and ultrasonic receiver layers.

The ultrasonic transceiver layer 101 may, in some alternative examples, include an array of ultrasonic transducer elements, such as an array of piezoelectric micromachined ultrasonic transducers (PMUTs), an array of capacitive micromachined ultrasonic transducers (CMUTs), etc. In some such examples, a piezoelectric receiver layer, PMUT elements in a single-layer array of PMUTs, or CMUT elements in a single-layer array of CMUTs, may be used as ultrasonic transmitters as well as ultrasonic receivers.

The TFT layer 102 may be a type of metal-oxide-semiconductor field-effect transistor (MOSFET) made by depositing thin films of an active semiconductor layer as well as a dielectric layer and metallic contacts over a TFT substrate. In some examples, the TFT substrate may be a non-conductive material such as glass. According to some implementations, the TFT layer 102 may have a thickness that is in the range of 50 microns to 400 microns.

In this implementation, the apparatus includes a foldable display stack 111. According to this example, the foldable display stack 111 includes a display stiffener 113 and display stack layers 115. The display stack layers 115 may, in some examples, include layers of a light-emitting diode (LED) display, such as an organic light-emitting diode (OLED) display. Some examples of display stack layers 115 are provided in this disclosure.

In this example, the display stack layers 115 form one or more display stack resonators. The display stack resonator(s) may, in some examples, be configured to enhance ultrasonic waves transmitted by the ultrasonic sensor stack in a first ultrasonic frequency range. In some examples, the one or more display stack resonators may include a first resonator bounded by the display stiffener 113 and a glass layer of the display stack layers 115. In some such examples, the first resonator may include a plurality of layers of an organic light-emitting diode display. In some examples, the one or more display stack resonators may include a second resonator bounded by the glass layer and an outer surface of the foldable display stack.

In some examples, the display stiffener 113 may have a relatively high acoustic impedance, e.g., an acoustic impedance of 10 MRayls or more. In some implementations, the display stiffener 113 may be, or may include, a metal layer (e.g., a stainless steel layer having an acoustic impedance of approximately 47 MRayls). However, in other implementations the display stiffener 113 may be, or may include, one or more other metals, or non-metal material having a relatively high modulus of elasticity. According to some examples, the display stiffener 113 may have a thickness in the range of 30 microns to 300 microns. According to some examples, the display stiffener 113 may have a thickness corresponding to a multiple of a half wavelength of a shear wave or a longitudinal wave having a frequency in a second ultrasonic frequency range that is higher than the first ultrasonic frequency range. However, in some instances the display stiffener 113 may not be, or may not include, a material having a high acoustic impedance. For example, in some instances the display stiffener 113 may be, or may include, a plastic layer such as a polycarbonate layer. In some such instances, the disclosed transmission enhancement layer 103 may not be beneficial.

According to this example, the apparatus 100 includes a transmission enhancement layer 103. In some examples, the transmission enhancement layer 103 may be, or may include, an aluminum layer having a thickness in a range from 50 microns to 100 microns, a copper layer having a thickness in a range from 25 microns to 50 microns or a stainless steel layer having a thickness in the range from 25 microns to 50 microns. According to some examples, the transmission enhancement layer 103 may have a thickness of less than a quarter wavelength of a shear wave or a longitudinal wave having a frequency in the first ultrasonic frequency range. In some examples, the transmission enhancement layer 103 may reside between the ultrasonic sensor stack 105 and the foldable display stack 111. In some such examples, the transmission enhancement layer 103 may reside between the ultrasonic sensor stack 105 and the display stiffener 113. According to some such examples, the display stiffener 113, the transmission enhancement layer 103 and at least a portion of the ultrasonic sensor stack 105 (e.g., the TFT substrate of the TFT layer 102) form a transmission enhancement resonator that is configured to enhance the ultrasonic waves transmitted by the ultrasonic sensor stack in an ultrasonic frequency range that is suitable for ultrasonic fingerprint sensors. Some examples are described below.

In some examples, the apparatus 100 may include a control system 106. The control system 106 (when present) may include one or more general purpose single- or multi-chip processors, digital signal processors (DSPs), application specific integrated circuits (ASICs), field programmable gate arrays (FPGAs) or other programmable logic devices, discrete gates or transistor logic, discrete hardware components, or combinations thereof. The control system 106 also may include (and/or be configured for communication with) one or more memory devices, such as one or more random access memory (RAM) devices, read-only memory (ROM) devices, etc. Accordingly, the apparatus 100 may have a memory system that includes one or more memory devices, though the memory system is not shown in FIG. 1. The control system 106 may be capable of receiving and processing data from the ultrasonic transceiver layer 101 and/or from an array of sensor pixels, e.g., as described below. In some implementations, functionality of the control system 106 may be partitioned between one or more controllers or processors, such as a dedicated sensor controller and an applications processor of a mobile device.

Some implementations of the apparatus 100 may include an interface system 107. In some examples, the interface system may include a wireless interface system. In some implementations, the interface system may include a user interface system, one or more network interfaces, one or more interfaces between the control system 106 and a memory system and/or one or more interfaces between the control system 106 and one or more external device interfaces (e.g., ports or applications processors).

The interface system 107 may be configured to provide communication (which may include wired or wireless communication, such as electrical communication, radio communication, etc.) between components of the apparatus 100. In some such examples, the interface system 107 may be configured to provide communication between the control system 106 and the ultrasonic receiver layer 101, to provide communication between the control system 106 and one or more of the display stack layers 115 and/or to provide communication between the control system 106 and an array of sensor pixels. According to some such examples, a portion of the interface system 107 may couple at least a portion of the control system 106 to the ultrasonic receiver layer 101 and/or an array of sensor pixels, e.g., via electrically conducting material.

According to some examples, the interface system 107 may be configured to provide communication between the apparatus 100 and other devices and/or human beings. In some such examples, the interface system 107 may include one or more user interfaces. The interface system 107 may, in some examples, include one or more network interfaces and/or one or more external device interfaces (such as one or more universal serial bus (USB) interfaces). In some implementations, the apparatus 100 may include a memory system. The interface system 107 may, in some examples, include at least one interface between the control system 106 and a memory system.

The apparatus 100 may be used in a variety of different contexts, many examples of which are disclosed herein. For example, in some implementations a mobile device, such as a cell phone, a smart phone, a tablet, a laptop (e.g., a laptop touchpad), etc., may include at least a portion of the apparatus 100. In some implementations, a wearable device may include at least a portion of the apparatus 100. The wearable device may, for example, be a watch, a bracelet, an armband, a wristband, a ring, a headband or a patch. In some implementations, the control system 106 may reside in more than one device. For example, a portion of the control system 106 may reside in a wearable device and another portion of the control system 106 may reside in another device, such as a mobile device (e.g., a smartphone or a tablet computer) and/or a server. The interface system 107 also may, in some such examples, reside in more than one device.

Figure 2:
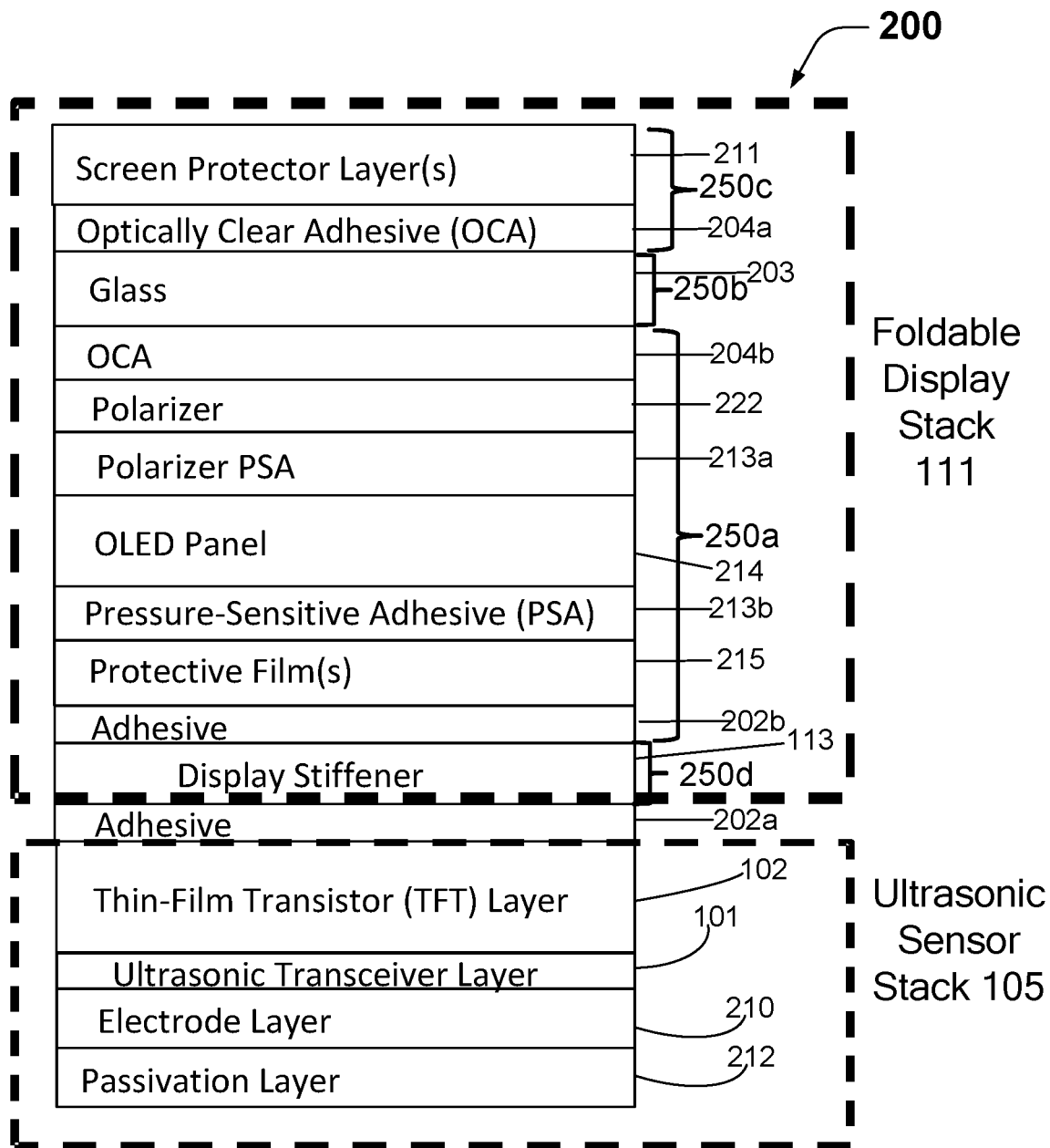
FIG. 2 shows examples of a foldable display stack and an ultrasonic sensor stack.

FIG. 2 shows examples of a foldable display stack and an ultrasonic sensor stack. The types, number and arrangement of elements shown in FIG. 2 are merely examples. Other examples may include different types, numbers and/or arrangements of elements. Moreover, the elements shown in FIG. 2 are not drawn to scale.

The apparatus 200 is similar to the apparatus 100 shown in FIG. 1, but does not include the transmission enhancement layer 103. The apparatus 200 includes instances of the ultrasonic sensor stack 105 and of the foldable display stack 111 of FIG. 1. Here, the ultrasonic sensor stack 105 is attached to the foldable display stack 111 via an adhesive layer 202a. The adhesive layer 202a may be, or may include, a thin pressure-sensitive adhesive (PSA). In some instances, the adhesive layer 202a may be in the range of 2 microns to 10 microns.

The ultrasonic sensor stack 105 includes a TFT layer 102, an ultrasonic transceiver layer 101 and an electrode layer 210. The TFT layer 102 resides between the ultrasonic transceiver layer 101 and the foldable display stack 111, and the adhesive layer 202a connects the TFT layer 102 to the foldable display stack 111. In some alternative examples, the ultrasonic transceiver layer 101 may reside between the TFT layer 102 and the foldable display stack 111. The ultrasonic transceiver layer 101 may be, or may include, one or more piezoelectric materials, such as a piezoelectric polymer and/or a piezoelectric copolymer. The electrode layer 210 may be, or may include, a conductive ink (e.g., silver ink). In this instance, the ultrasonic sensor stack 105 includes a passivation layer 212. The passivation layer 212 may be, or may include, an epoxy film.

The foldable display stack 111 includes a display stiffener 113 that resides between the TFT layer 102 and the other layers of the foldable display stack 111. The display stiffener 113 provides structural support for the other layers of the foldable display stack 111. In some examples, the display stiffener 113 may be, or may include, a high-impedance material (in other words, a material having a high acoustic impedance) such as metal.

The foldable display stack 111 includes one or more screen protector layers 211, which may include a polyethylene terephthalate (PET) layer in some instances. The foldable display stack 111 includes a glass layer 203, a polarizer layer 222, an OLED panel 214 and one or more layers of protective film 215. Here, an optically clear adhesive (OCA) layer 204a connects the one or more screen protector layers 211 to the glass layer 203 and an OCA layer 204b connects the glass layer 203 to the polarizer layer 222. A polarizer pressure-sensitive adhesive 213a connects the polarizer 222 to the OLED panel 214 and a pressure-sensitive adhesive 213b connects the OLED panel 214 to the one or more layers of protective film 215. The polarizer pressure-sensitive adhesive 213a may, for example, be an optically clear adhesive (OCA).

In this example, the adhesive layer 202b and layers of the foldable display stack 111 form the resonator 250a, which is bounded by the glass layer 203 and the display stiffener 113. According to this example, the resonator 250a includes the OCA layer 204b, the polarizer layer 222, the polarizer pressure-sensitive adhesive 213a, the OLED panel 214, the pressure-sensitive adhesive 213b, the one or more layers of protective film 215 and the adhesive layer 202b. In some examples, the thickness of the resonator 250a may correspond to a multiple N of a half wavelength at a peak frequency of an ultrasonic frequency range of ultrasonic waves transmitted by the ultrasonic sensor stack 105, where N is an integer greater than or equal to 1. In some such implementations, the resonator 250a may cause a local maximum within the ultrasonic frequency range. According to some examples, the local maximum may correspond to a frequency in the range from 5 MHz to 15 MHz, or from 1 MHz to 20 MHz. According to some such implementations, a frequency range that includes the local ultrasonic wave transmission maximum caused by the resonator 250a may correspond with a frequency range that includes a local ultrasonic wave transmission maximum caused by the resonator 250c.

According to this example, the foldable display stack 111 also includes the resonator 250c, which is formed by the one or more screen protector layers 211 and the OCA 204a, and is bounded by the glass layer 203: here, the glass layer 203 has a higher acoustic impedance than that of the one or more screen protector layers 211 or the OCA 204a. In some examples, the thickness of the resonator 250c may correspond to a multiple N of a quarter wavelength at a peak frequency of an ultrasonic frequency range of ultrasonic waves transmitted by the ultrasonic sensor stack 105, where N is an integer greater than or equal to 1. In some such implementations, the resonator 250c may cause a local maximum within the ultrasonic frequency range. According to some examples, the local maximum may correspond to a frequency in the range from 5 MHz to 15 MHz, or from 1 MHz to 20 MHz. According to some such implementations, a frequency range that includes the local ultrasonic wave transmission maximum caused by the resonator 250a may correspond with a frequency range that includes a local ultrasonic wave transmission maximum caused by the resonator 250c.

In this implementation, the glass layer 203 forms a resonator 250b. According to some examples, the frequencies for maximum transmission of ultrasonic waves through the resonator 250b may be outside of (e.g., below) the frequency range that includes the local maxima caused by the resonators 250a and 250c. In some examples, the thickness of the resonator 250b may be less than a multiple N of a quarter wavelength at a peak frequency of an ultrasonic frequency range of ultrasonic waves transmitted by the ultrasonic sensor stack 105, where N is an integer greater than or equal to 1.

In this example, the display stiffener 113 forms the resonator 250d. According to this example, the resonator 250d causes a very low transmission of ultrasonic waves in the frequency range from 5 MHz to 15 MHz. The low transmission of ultrasonic waves caused by the display stiffener 113 represents a significant challenge for the design of under-display ultrasonic sensors.

Figure 3:
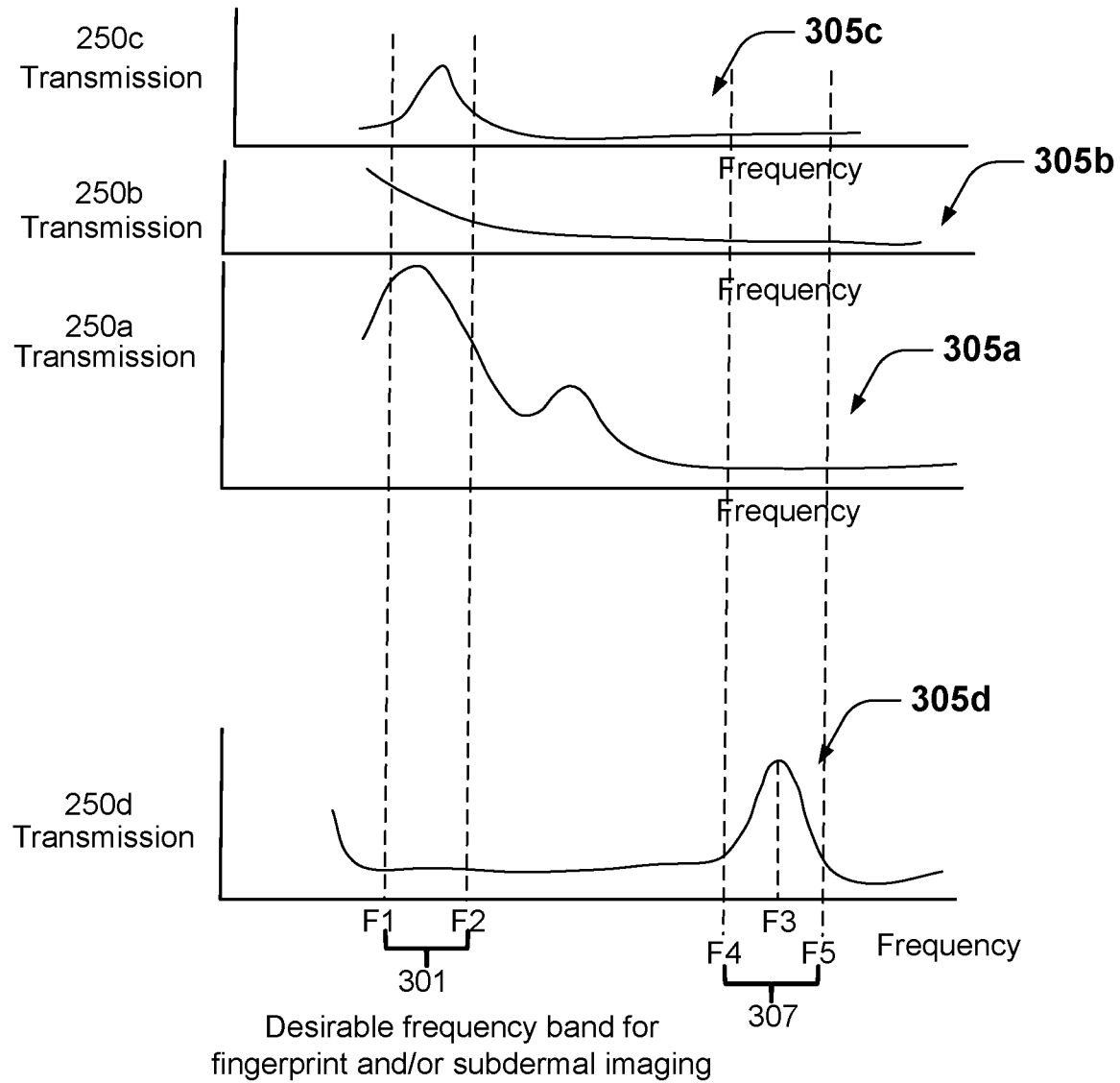
FIG. 3 shows examples of ultrasonic transmission versus ultrasonic frequency graphs corresponding to examples of the resonators shown in FIG. 2.

FIG. 3 shows examples of ultrasonic transmission versus ultrasonic frequency graphs corresponding to examples of the resonators shown in FIG. 2. In these examples, graph 305a indicates the ultrasonic transmission amplitudes of the resonator 250a at various frequencies, graph 305b indicates the ultrasonic transmission amplitudes of the resonator 250b at various frequencies, graph 305c indicates the ultrasonic transmission amplitudes of the resonator 250c at various frequencies and graph 305d indicates the ultrasonic transmission amplitudes of the resonator 250d at various frequencies. However, these ultrasonic transmission amplitudes are merely specific examples, based on the thicknesses and materials used in a particular foldable display stack 111.

In these examples, the frequency band 301 between frequencies F1 and F2 is a desirable frequency band for ultrasonic imaging relating to authentication. In some examples, the frequency band 301 may be suitable for fingerprint imaging, whereas in some examples the frequency band 301 may be suitable for sub-epidermal imaging. In some instances, the frequency band 301 may include frequencies in the range from 5 MHz to 15 MHz, or in the range from 1 MHz to 20 MHz. In one example, the frequency band 301 is in the range of 6 MHz to 8 MHz. In another example, the frequency band 301 is in the range from 11 MHz to 14 MHz.

According to the examples shown in FIG. 3, the resonators 250a and 250c cause a local ultrasonic transmission amplitude maximum within the ultrasonic frequency band 301. These local amplitude maxima are examples of what may be referred to herein as "display stack-induced local amplitude maxima." In these examples, the peak frequency of the local ultrasonic transmission maximum caused by the resonator 250a is lower than the peak frequency of the local ultrasonic transmission maximum caused by the resonator 250c. In this instance, graph 305b indicates no local ultrasonic transmission maximum caused by the resonator 250b within the ultrasonic frequency band 301. However, the level of ultrasonic transmission caused by the resonator 250b is greater for frequencies within the ultrasonic frequency band 301 than for higher frequencies. The terms "frequency band" and "frequency range" are used synonymously in this disclosure.

In this example, the resonator 250d—corresponding to the display stiffener 113 shown in FIG. 2—causes a local ultrasonic transmission maximum at a peak frequency of F3, within a second ultrasonic frequency band 307 that spans a higher frequency range (in this example, from frequency F4 to frequency F5) than the ultrasonic frequency band 301. However, in this example, the resonator 250d causes very low levels of ultrasonic transmission within the frequency band 301. Accordingly, the graph 305d shows an example of the low levels of ultrasonic wave transmission within a frequency band suitable for ultrasonic fingerprint sensor imaging that is caused by the display stiffener 113.

Although graphs 305a-305d are merely examples corresponding to a particular foldable display stack configuration, the present inventors have found it to be generally true that display stiffeners of foldable display stacks often cause a low transmission of ultrasonic waves in a frequency band for suitable for fingerprint imaging (e.g., in the range from 10 MHz to 20 MHz) and/or a frequency band for suitable for sub-epidermal imaging (e.g., in the range from 1 MHz to 10 MHz). In response to this design challenge, the present inventors have developed methods and devices for improving the transmissions of ultrasonic waves in one or more frequency bands suitable for fingerprint imaging and/or sub-epidermal imaging. In some disclosed implementations, the display stiffener, the transmission enhancement layer and at least a portion of the ultrasonic sensor stack form a transmission enhancement resonator that is configured to enhance the ultrasonic waves transmitted by the ultrasonic sensor stack in an ultrasonic frequency range that is suitable for ultrasonic fingerprint sensors.

Figure 4:
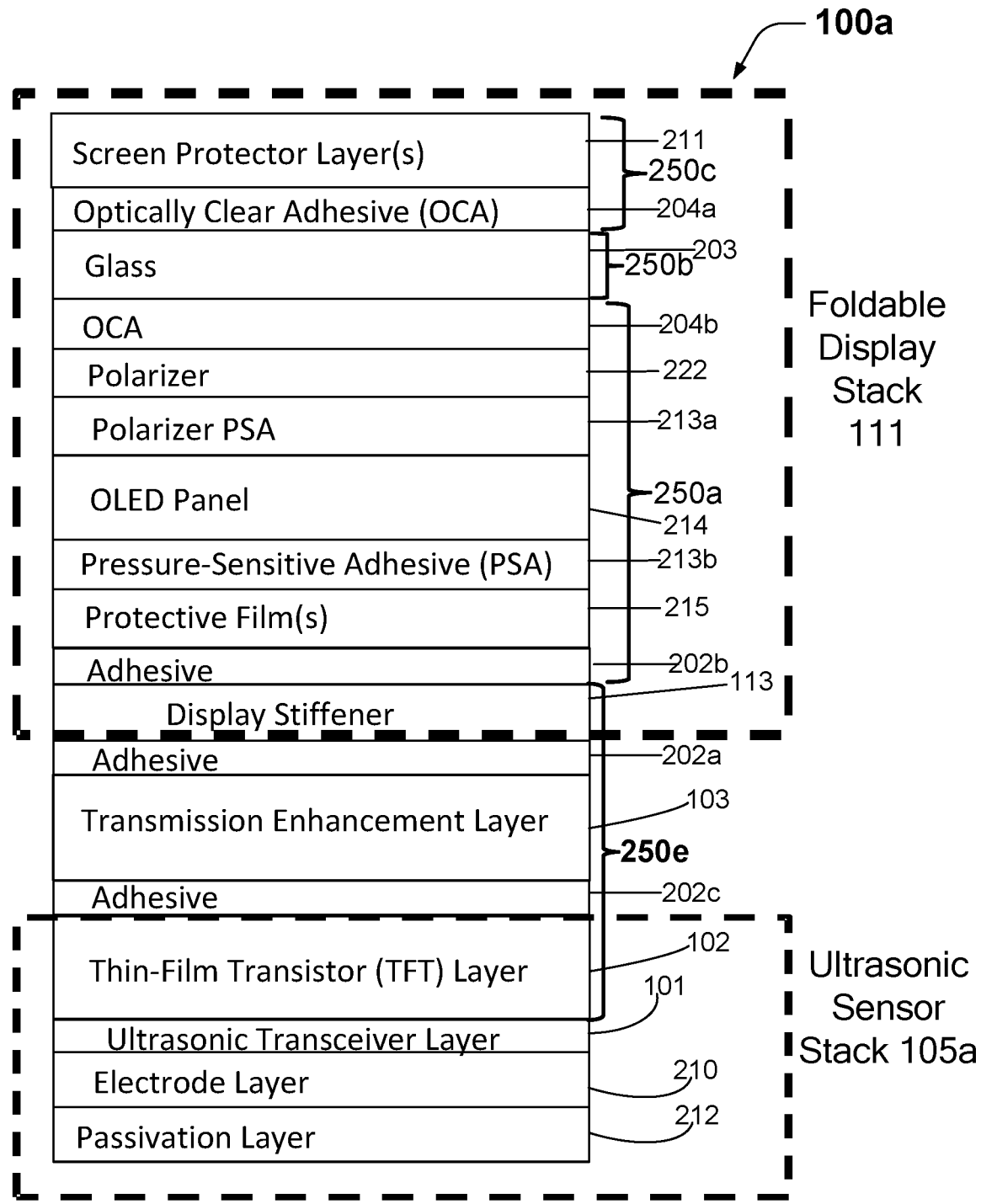
FIG. 4 shows examples of a foldable display stack and an ultrasonic sensor stack according to some disclosed implementations.

FIG. 4 shows examples of a foldable display stack and an ultrasonic sensor stack according to some disclosed implementations. As with other disclosed implementations, the types, number and arrangement of elements shown in FIG. 4 are merely examples. Other implementations may include different types, numbers and/or arrangements of elements. Moreover, the elements shown in FIG. 4 are not drawn to scale.

In this example the apparatus 100a is similar to the apparatus 200 shown in FIG. 2. However, in this implementation the apparatus 100a includes an instance of the transmission enhancement layer 103 that is described above with reference to FIG. 1. According to this example, the apparatus 100a includes instances of the ultrasonic sensor stack 105 and of the foldable display stack 111 of FIG. 1. In this example, the transmission enhancement layer 103 is attached to the foldable display stack 111 via an adhesive layer 202a and the ultrasonic sensor stack 105a is attached to the transmission enhancement layer 103 via an adhesive layer 202c. In some examples, the adhesive layers 202a and/or 202c may be, or may include, a thin pressure-sensitive adhesive (PSA). In some instances, the adhesive layers 202a and/or 202c may be in the range of 1 micron to 10 microns.

According to this example, the ultrasonic sensor stack 105a includes a TFT layer 102, an ultrasonic transceiver layer 101 and an electrode layer 210. According to some implementations, the thickness of the TFT layer 102 may be in the range of 50 microns to 150 microns, e.g., 50 microns, 55 microns, 60 microns, 65 microns, 70 microns, 75 microns, 80 microns, 85 microns, 90 microns, 95 microns, 100 microns, 105 microns, 110 microns, 115 microns, 120 microns, 125 microns, 130 microns, 135 microns, 140 microns, 145 microns or 150 microns. In this example, the TFT layer 102 resides between the ultrasonic transceiver layer 101 and the foldable display stack 111, and the adhesive layer 202a connects the TFT layer 102 to the foldable display stack 111. In some alternative implementations, the ultrasonic transceiver layer 101 may reside between the TFT layer 102 and the foldable display stack 111.

According to some examples, the ultrasonic transceiver layer 101 may be, or may include, one or more piezoelectric materials, such as a piezoelectric polymer and/or a piezoelectric copolymer. In some examples, the thickness of the ultrasonic transceiver layer 101 may be in the range of 5 microns to 20 microns, e.g., 5 microns, 6 microns, 7 microns, 8 microns, 9 microns, 10 microns, 11 microns, 12 microns, 13 microns, 14 microns, 15 microns, 16 microns, 17 microns, 18 microns, 19 microns or 20 microns.

According to some implementations, the electrode layer 210 may be, or may include, a conductive ink (e.g., silver ink). However, in other implementations the electrode layer 210 may be, or may include, other types of conductors, such as copper, gold, etc. In some examples, the thickness of the electrode layer 210 may be in the range of 10 microns to 30 microns, e.g., 10 microns, 11 microns, 12 microns, 13 microns, 14 microns, 15 microns, 16 microns, 17 microns, 18 microns, 19 microns, 20 microns, 21 microns, 22 microns, 23 microns, 24 microns, 25 microns, 26 microns, 27 microns, 28 microns, 29 microns or 30 microns.

In this instance, the ultrasonic sensor stack 105a includes a passivation layer 212. According to some examples, the passivation layer 212 may be, or may include, an epoxy film. In some examples, the passivation layer 212 may be in the range of 10 microns to 30 microns, e.g., 10 microns, 11 microns, 12 microns, 13 microns, 14 microns, 15 microns, 16 microns, 17 microns, 18 microns, 19 microns, 20 microns, 21 microns, 22 microns, 23 microns, 24 microns, 25 microns, 26 microns, 27 microns, 28 microns, 29 microns or 30 microns.

In this example, the foldable display stack 111 includes the same layers that are described above with reference to FIG. 2. In this instance, the foldable display stack 111 includes a display stiffener 113 that resides between the TFT layer 102 and the other layers of the foldable display stack 111. The display stiffener 113 provides structural support for the other layers of the foldable display stack 111. In some examples, the display stiffener 113 may be, or may include, a high-impedance material such as metal. According to some such implementations, the display stiffener 113 may include stainless steel. However, in other implementations the display stiffener 113 may be, or may include, one or more other metals, or non-metal material having a relatively high modulus of elasticity. In some examples, the display stiffener 113 may have a thickness in the range of 30 microns to 300 microns, e.g., 30 microns, 35 microns, 40 microns, 45 microns, 50 microns, 55 microns, 60 microns, 65 microns, 70 microns, 75 microns, 80 microns, 85 microns, 90 microns, 95 microns, 100 microns, 105 microns, 110 microns, 115 microns, 120 microns, 125 microns, 130 microns, 135 microns, 140 microns, 145 microns, 150 microns, 155 microns, 160 microns, 165 microns, 170 microns, 175 microns, 180 microns, 185 microns, 190 microns, 195 microns, 200 microns, 205 microns, 210 microns, 215 microns, 220 microns, 225 microns, 230 microns, 235 microns, 240 microns, 245 microns, 250 microns, 255 microns, 260 microns, 265 microns, 270 microns, 275 microns, 280 microns, 285 microns, 290 microns, 295 microns or 300 microns.

In this example, the adhesive layer 202b and layers of the foldable display stack 111 form the resonator 250a, which is bounded by the glass layer 203 and the display stiffener 113. In some examples, the thickness of the resonator 250a may correspond to a multiple N of a half wavelength at a peak frequency of an ultrasonic frequency range of ultrasonic waves transmitted by the ultrasonic sensor stack 105a, where N is an integer greater than or equal to 1. In some such implementations, the resonator 250a may cause a local maximum within an ultrasonic frequency range. According to some examples, the local maximum may correspond to a frequency in the range from 5 MHz to 15 MHz, or from 1 MHz to 20 MHz. According to some such implementations, a frequency range that includes the local ultrasonic wave transmission maximum caused by the resonator 250a may correspond with a frequency range that includes a local ultrasonic wave transmission maximum caused by the resonator 250c.

According to this example, the foldable display stack 111 also includes the resonator 250c, which is formed by the one or more screen protector layers 211 and the OCA 204a, and is bounded by the glass layer 203: here, the glass layer 203 has a higher acoustic impedance than that of the one or more screen protector layers 211 or the OCA 204a. In some examples, the thickness of the resonator 250c may correspond to a multiple N of a quarter wavelength at a peak frequency of an ultrasonic frequency range of ultrasonic waves transmitted by the ultrasonic sensor stack 105a, where N is an integer greater than or equal to 1. In some such implementations, the resonator 250c may cause a local maximum within the ultrasonic frequency range. According to some examples, the local maximum may correspond to a frequency in the range from 5 MHz to 15 MHz, or from 1 MHz to 20 MHz. According to some such implementations, a frequency range that includes the local ultrasonic wave transmission maximum caused by the resonator 250a may correspond with a frequency range that includes a local ultrasonic wave transmission maximum caused by the resonator 250c.

In this implementation, the glass layer 203 forms a resonator 250b. According to some examples, the frequencies for maximum transmission of ultrasonic waves through the resonator 250b may be outside of (e.g., below) the frequency range that includes the local maximum caused by the resonator 250a.

In this example, the resonator 250e includes the display stiffener 113, the transmission enhancement layer 103 and the TFT layer 102, as well as the adhesive layers 202a and 202c. Although the resonator 250d formed by the display stiffener 113 alone causes a very low transmission of ultrasonic waves in the frequency range from 5 MHz to 15 MHz, in this example the resonator 250e causes at least one local ultrasonic wave transmission maximum in the frequency range from 5 MHz to 15 MHz, or from 1 MHz to 20 MHz.

Figure 5:
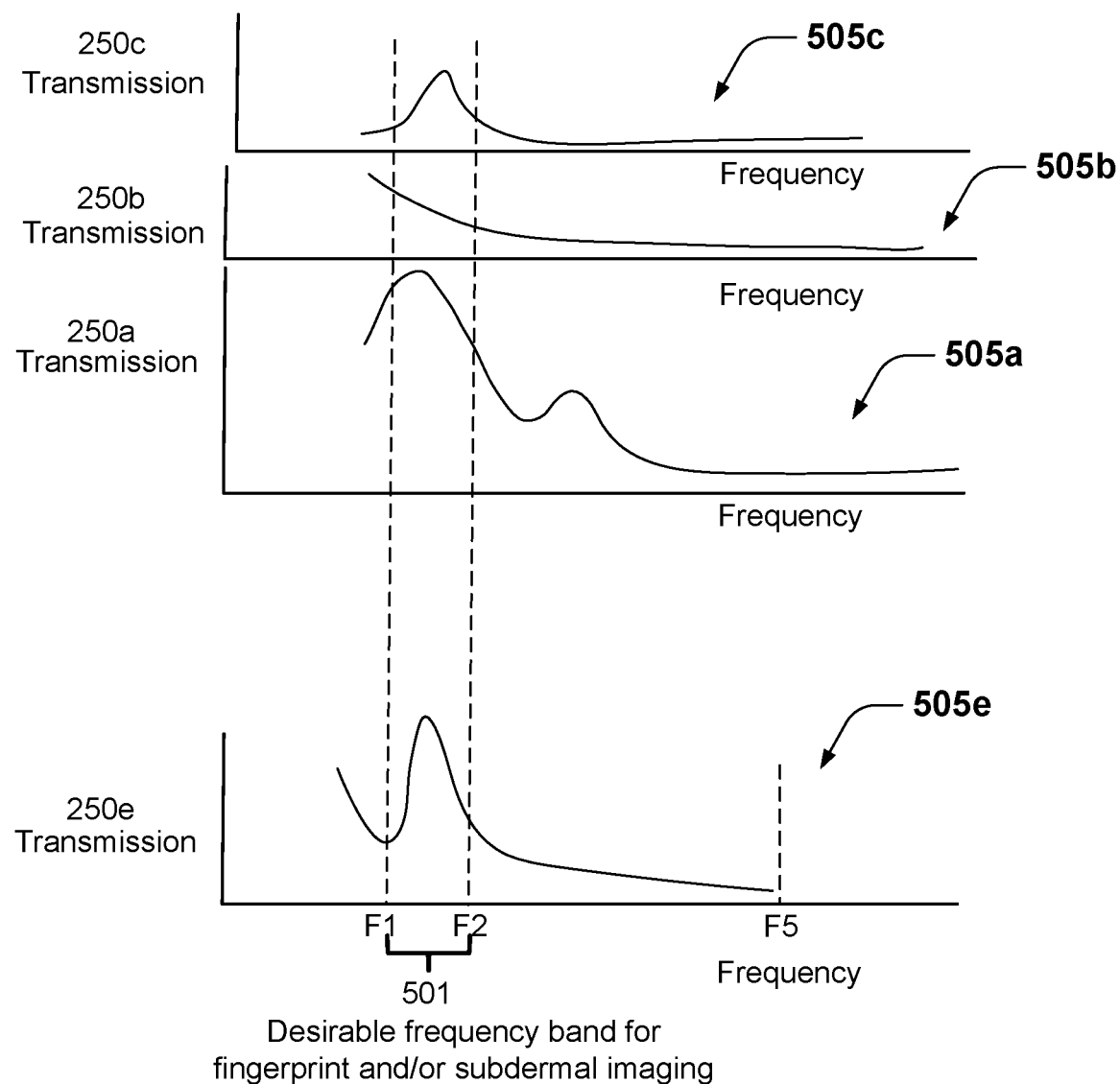
FIG. 5 shows examples of ultrasonic transmission versus ultrasonic frequency graphs corresponding to examples of the resonators shown in FIG. 4.

The resonator 250e is one example of what may be referred to herein as a "transmission enhancement resonator," which is configured to enhance the ultrasonic waves transmitted by the ultrasonic sensor stack in at least a first ultrasonic frequency range (for example, the frequency band 301 of FIG. 3 or the frequency band 501 of FIG. 5). According to the example shown in FIG. 4, the transmission enhancement layer 103, the display stiffener 113, at least a portion of the ultrasonic sensor stack 105a (e.g., the TFT layer 102) forming the transmission enhancement resonator 250e. The transmission enhancement resonator 250e may, in some instances, be configured to cause ultrasonic waves transmitted by the ultrasonic sensor stack 105a to have a local amplitude maximum (which may be referred to herein as a "transmission enhancement resonator-induced local maximum") in the first ultrasonic frequency range. Such a local maximum is one example of what is referred to herein as "enhancing" the ultrasonic waves transmitted by the ultrasonic sensor stack in the first ultrasonic frequency range. In some examples, the transmission enhancement resonator 250e may "enhance" the ultrasonic waves in an ultrasonic frequency range by allowing the ultrasonic waves in that frequency range to pass at a relatively higher amplitude, as compared to the amplitude of ultrasonic waves in that frequency range in an apparatus that does not include the transmission enhancement resonator 250e. In some such implementations, the transmission enhancement resonator 250e may "enhance" the ultrasonic waves in an ultrasonic frequency range by acting as a bandpass filter for ultrasonic waves in the ultrasonic frequency range. According to some examples, the transmission enhancement resonator 250e may "enhance" the ultrasonic waves in an ultrasonic frequency range by reducing the acoustic impedance of the display stiffener 113 alone (in other words, of the display stiffener 113 in an apparatus lacking the transmission enhancement resonator 250e, such as that shown in FIG. 2) to ultrasonic waves in the ultrasonic frequency range. The combination of the transmission enhancement layer 103 and the display stiffener 113 (and, in some examples, at least a portion of the ultrasonic sensor stack 105a) may allow the ultrasonic waves in that frequency range to pass at a relatively higher amplitude, as compared to the amplitude of ultrasonic waves in that frequency range passed by an apparatus that does not include the transmission enhancement resonator 250e, and/or may cause a local amplitude maximum in that frequency range.

The specific range of frequencies (and/or the frequency corresponding to a local ultrasonic wave transmission maximum) may, in some implementations, be selected to match a high-transmission frequency range of one or more resonators of the foldable display stack 111. In some such examples, the thickness of the resonator 250e may correspond to a multiple N of a half wavelength at a peak frequency of an ultrasonic frequency range of ultrasonic waves transmitted by the ultrasonic sensor stack 105a, where N is an integer greater than or equal to 1. According to some such implementations, a frequency range that includes the local ultrasonic wave transmission maximum caused by the resonator 250e may correspond with a frequency range that includes a local ultrasonic wave transmission maximum caused by the resonator 250a and/or a frequency range that includes a local ultrasonic wave transmission maximum caused by the resonator 250c.

FIG. 5 shows examples of ultrasonic transmission versus ultrasonic frequency graphs corresponding to examples of the resonators shown in FIG. 4. In these examples, graph 505a indicates the ultrasonic transmission amplitudes of the resonator 250a at various frequencies, graph 505b indicates the ultrasonic transmission amplitudes of the resonator 250b at various frequencies, graph 505c indicates the ultrasonic transmission amplitudes of the resonator 250c at various frequencies and graph 505e indicates the ultrasonic transmission amplitudes of the resonator 250e at various frequencies. However, these ultrasonic transmission amplitudes are merely specific examples, based on the thicknesses and materials used in a particular foldable display stack 111.

In these examples, the frequency band 501 between frequencies F1 and F2 is a desirable frequency band for ultrasonic imaging relating to authentication. In some examples, the frequency band 501 may be suitable for fingerprint imaging. In some implementations, the frequency band 501 may be suitable for sub-epidermal imaging. In some instances, the frequency band 501 may include frequencies in the range from 5 MHz to 15 MHz, or from 1 MHz to 20 MHz. In one example, the frequency band 501 may be in the range of 6 MHz to 8 MHz. In another example, the frequency band 501 may be in the range of 11 MHz to 14 MHz.

According to the examples shown in FIG. 5, the resonators 250a and 250c cause a local ultrasonic transmission amplitude maximum within the frequency band 501. In these examples, the peak frequency of the local ultrasonic transmission amplitude maximum caused by the resonator 250a is lower than the peak frequency of the local ultrasonic transmission amplitude maximum caused by the resonator 250c. In this instance, graph 505b indicates no local ultrasonic transmission amplitude maximum caused by the resonator 250b within the frequency band 501. However, the level of ultrasonic transmission caused by the resonator 250b is greater for frequencies within the frequency band 501 than for frequencies that are higher than those within the frequency band 501.

Unlike the above-described resonator 250d—corresponding to the display stiffener 113 shown in FIG. 2 alone—the resonator 250e causes a local ultrasonic transmission amplitude peak within the frequency band 501. As noted above, the resonator 250e is one example of what may be referred to herein as a "transmission enhancement resonator," which is configured to enhance the ultrasonic waves transmitted by the ultrasonic sensor stack in at least a first ultrasonic frequency range (in this example, the frequency band 501). The local ultrasonic transmission amplitude peak within the frequency band 501 is one example of what is referred to herein as "enhancing" the ultrasonic waves transmitted by the ultrasonic sensor stack in the first ultrasonic frequency range. In some examples, the transmission enhancement resonator 250e may "enhance" the ultrasonic waves in an ultrasonic frequency range by allowing the ultrasonic waves in that frequency range to pass at a relatively higher amplitude, as compared to the amplitude of ultrasonic waves in that frequency range in an apparatus that does not include the transmission enhancement resonator 250e. In some such implementations, the transmission enhancement resonator 250e may "enhance" the ultrasonic waves in an ultrasonic frequency range by acting as a bandpass filter for ultrasonic waves in the ultrasonic frequency range.

Figure 6:
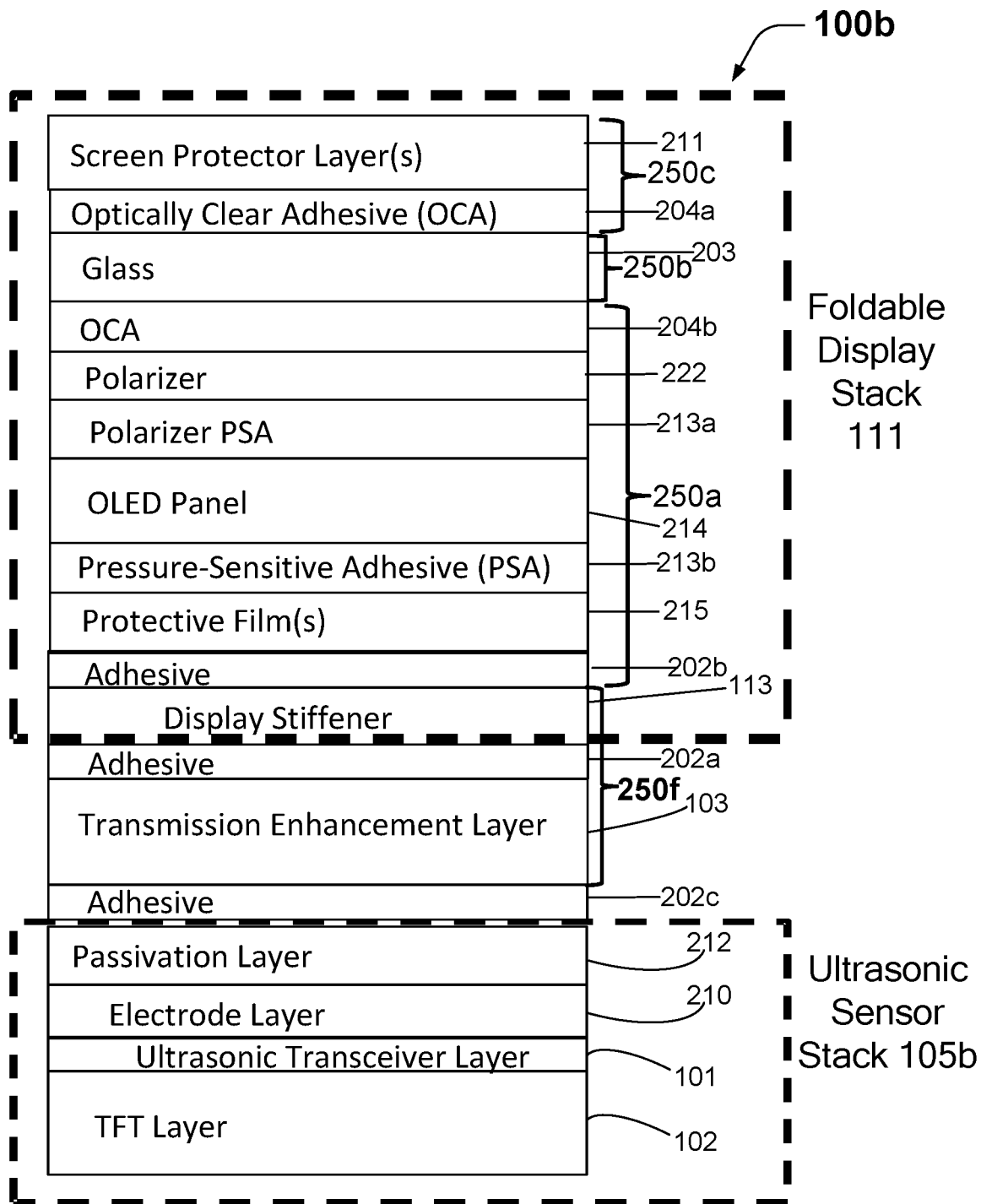
FIG. 6 shows examples of a foldable display stack and an ultrasonic sensor stack.

FIG. 6 shows examples of a foldable display stack and an ultrasonic sensor stack. As with other disclosed implementations, the types, number and arrangement of elements shown in FIG. 6 are merely examples. Other implementations may include different types, numbers and/or arrangements of elements. Moreover, the elements shown in FIG. 6 are not drawn to scale.

In this example the apparatus 100b is similar to the apparatus 100a shown in FIG. 4, because in this implementation the apparatus 100b includes an instance of the transmission enhancement layer 103 that is described above. As with the example of the apparatus 100a that is described above with reference to FIG. 4, the apparatus 100b also includes instances of the ultrasonic sensor stack 105 and of the foldable display stack 111 of FIG. 1. As in the example that is described above with reference to FIG. 4, in this example the transmission enhancement layer 103 is attached to the foldable display stack 111 via an adhesive layer 202a and the ultrasonic sensor stack 105b is attached to the transmission enhancement layer 103 via an adhesive layer 202c. In some examples, the adhesive layers 202a and/or 202c may be, or may include, a thin pressure-sensitive adhesive (PSA). In some instances, the adhesive layers 202a and/or 202c may be in the range of 1 micron to 10 microns.

According to this example, the ultrasonic sensor stack 105b includes a TFT layer 102, an ultrasonic transceiver layer 101, an electrode layer 210 and a passivation layer 212. However, unlike the implementation that is described above with reference to FIG. 4, in this example the ultrasonic transceiver layer 101, the electrode layer 210 and the passivation layer 212 reside between the TFT layer 102 and the transmission enhancement layer 103.

In this example, the foldable display stack 111 includes the same layers that are described above with reference to FIGS. 2 and 4. Other implementations may provide other foldable display stack layers, foldable display stack layers having different materials and/or thicknesses, etc.

In this example, the adhesive layer 202b and layers of the foldable display stack 111 form the resonator 250a, which is bounded by the glass layer 203 and the display stiffener 113. In some examples, the thickness of the resonator 250a may correspond to a multiple N of a half wavelength at a peak frequency of an ultrasonic frequency range of ultrasonic waves transmitted by the ultrasonic sensor stack 105b, where N is an integer greater than or equal to 1. In some such implementations, the resonator 250a may cause a local maximum within an ultrasonic frequency range. According to some examples, the local maximum may correspond to a frequency in the range from 5 MHz to 15 MHz, or from 1 MHz to 20 MHz. According to some such implementations, a frequency range that includes the local ultrasonic wave transmission maximum caused by the resonator 250a may correspond with a frequency range that includes a local ultrasonic wave transmission maximum caused by the resonator 250c.

According to this example, the foldable display stack 111 also includes the resonator 250c, which is formed by the one or more screen protector layers 211 and the OCA 204a, and is bounded by the glass layer 203: here, the glass layer 203 has a higher acoustic impedance than that of the one or more screen protector layers 211 or the OCA 204a. In some examples, the thickness of the resonator 250c may correspond to a multiple N of a quarter wavelength at a peak frequency of an ultrasonic frequency range of ultrasonic waves transmitted by the ultrasonic sensor stack 105b, where N is an integer greater than or equal to 1. In some such implementations, the resonator 250c may cause a local maximum within the ultrasonic frequency range. According to some examples, the local maximum may correspond to a frequency in the range from 5 MHz to 15 MHz, or from 1 MHz to 20 MHz. According to some such implementations, a frequency range that includes the local ultrasonic wave transmission maximum caused by the resonator 250a may correspond with a frequency range that includes a local ultrasonic wave transmission maximum caused by the resonator 250c.

In this implementation, the glass layer 203 forms a resonator 250b. According to some examples, the frequencies for maximum transmission of ultrasonic waves through the resonator 250b may be outside of (e.g., below) the frequency range that includes the local maximum caused by the resonator 250a.

The resonator 250f is another example of what may be referred to herein as a "transmission enhancement resonator," which is configured to enhance the ultrasonic waves transmitted by the ultrasonic sensor stack in at least a first ultrasonic frequency range (for example, the frequency band 301 of FIG. 3 or the frequency band 501 of FIG. 5). In this example, the resonator 250f includes the display stiffener 113, the transmission enhancement layer 103 and the adhesive layer 202a.

According to this implementation and unlike the implementation that is described above with reference to FIG. 4, the transmission enhancement resonator does not include the TFT layer 102 in this example. This is because the ultrasonic transceiver layer 101, the electrode layer 210 and the passivation layer 212, all of which generally have a lower acoustic impedance than those of the display stiffener 113 and the transmission enhancement layer 103, reside between the TFT layer 102 and the transmission enhancement layer 103 in this example. In some such examples, the thickness of the resonator 250f may correspond to a multiple N of a half wavelength at a peak frequency of an ultrasonic frequency range of ultrasonic waves transmitted by the ultrasonic sensor stack 105b, where N is an integer greater than or equal to 1. In some examples, the thickness of the resonator 250f may be in a range from 50-150 microns. Although the resonator 250d formed by the display stiffener 113 causes a very low transmission of ultrasonic waves in the frequency range from 5 MHz to 15 MHz, in this example the resonator 250f causes at least one local ultrasonic wave transmission maximum in the frequency range from 5 MHz to 15 MHz, or from 1 MHz to 20 MHz.

The specific range of frequencies (and/or the frequency corresponding to a local ultrasonic wave transmission maximum) may, in some implementations, be selected to match a high-transmission frequency range of one or more resonators of the foldable display stack 111. According to some such implementations, a frequency range that includes the local ultrasonic wave transmission maximum caused by the resonator 250f may correspond with a frequency range that includes a local ultrasonic wave transmission maximum caused by the resonator 250a and/or a frequency range that includes a local ultrasonic wave transmission maximum caused by the resonator 250c.

Figure 7:
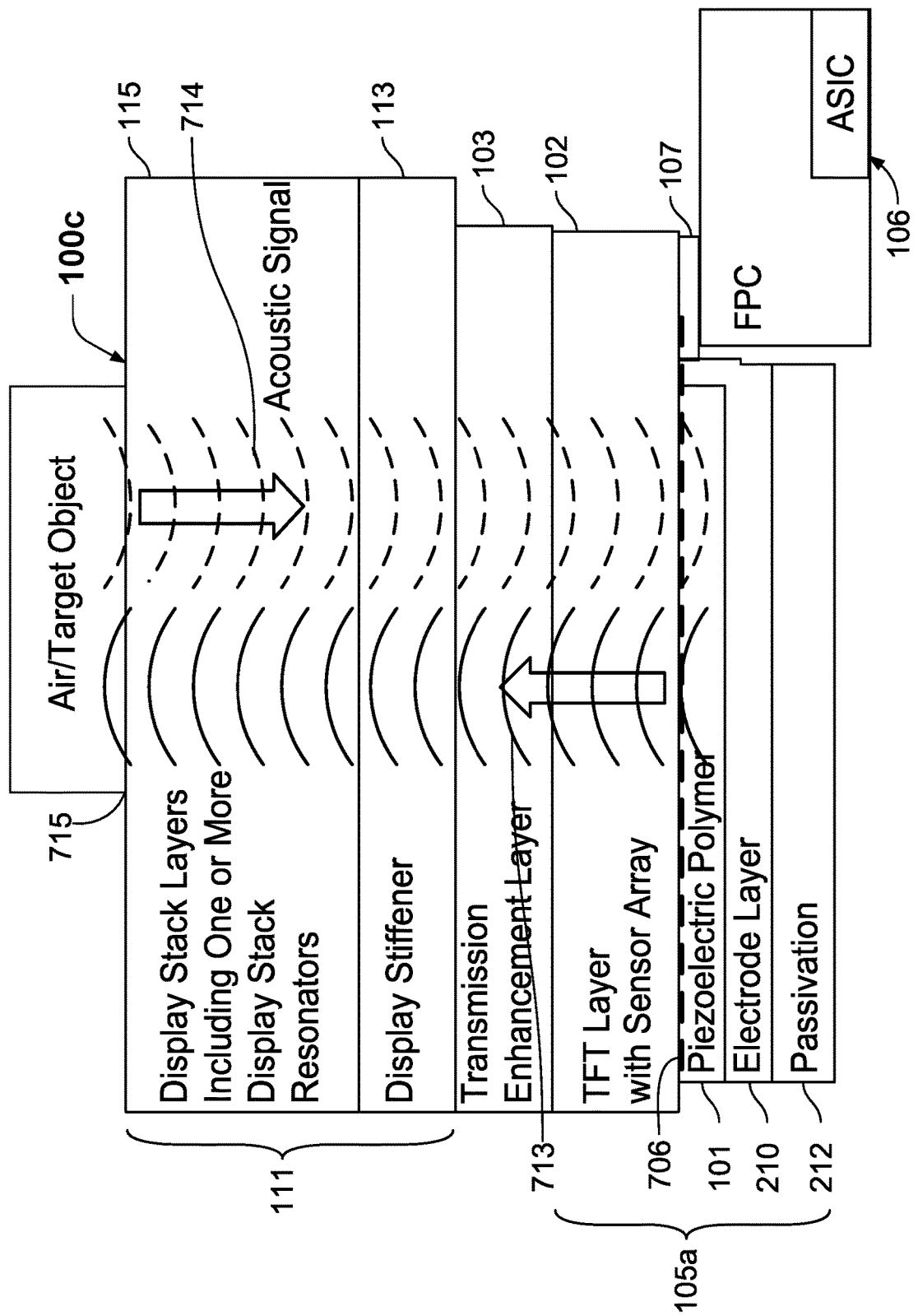
FIG. 7 shows example components of an apparatus according to some disclosed implementations.

FIG. 7 shows example components of an apparatus according to some disclosed implementations. As with other disclosed implementations, the types, number and arrangement of elements, as well as the dimensions of elements, are merely examples. According to this example, the apparatus 100c is configured to perform at least some of the methods disclosed herein. According to this implementation, the ultrasonic sensor stack 105a includes a ultrasonic transceiver layer 101, an electrode layer 210 on one side of the ultrasonic transceiver layer 101 and an array of sensor pixels 706 on a second and opposing side of the ultrasonic transceiver layer 101. In this implementation, the ultrasonic transceiver layer 101 includes one or more piezoelectric polymers. In other implementations, the ultrasonic transceiver layer 101 may include other types of piezoelectric materials.

According to this example, the electrode layer 210 resides between a passivation layer 212 and the ultrasonic transceiver layer 101. In some examples, the passivation layer 212 may include an adhesive, such as an epoxy film, a polymer layer (such as a polyethylene terephthalate (PET) layer), etc.

In this example the TFT layer 102 includes a TFT substrate and circuitry for the array of sensor pixels 706. The TFT layer 102 may be a type of metal-oxide-semiconductor field-effect transistor (MOSFET) made by depositing thin films of an active semiconductor layer as well as a dielectric layer and metallic contacts over a TFT substrate. In some examples, the TFT substrate may be a non-conductive material such as glass.

In this example, the apparatus 100c includes a foldable display stack 111, which includes a display stiffener 113 and display stack layers 115 in this instance. According to this example, the display stack layers 115 form one or more display stack resonators. In some instances, the one or more display stack resonators may be, or may include, the resonators 250a, 250b and/or 250c that are described above.

According to some examples, a transmission enhancement resonator that includes the display stiffener 113 and the transmission enhancement layer 103 may be configured to enhance the ultrasonic waves transmitted by the ultrasonic sensor stack 105a in at least one ultrasonic frequency range. In some implementations, the transmission enhancement resonator also may include the TFT layer 102. In some examples, the transmission enhancement resonator may cause a local maximum of ultrasonic wave transmission in at least one ultrasonic frequency range. The at least one ultrasonic frequency range may, in some instances, be a frequency range in which one or more display stack resonators cause a local maximum of ultrasonic wave transmission.

According to this implementation, the TFT layer 102, the array of sensor pixels 706 and the electrode are electrically coupled to at least a portion of the control system 106 and one side of the ultrasonic transceiver layer 101 via a portion of the interface system 107, which includes electrically conducting material and a flexible printed circuit (FPC) in this instance.

In this example, the apparatus 100c is configured to perform at least some of the methods disclosed herein. In this example, the control system 106 is configured to control the ultrasonic sensor system to transmit one or more ultrasonic waves 713. According to this example, the ultrasonic waves 713 are transmitted through the TFT layer 102, the transmission enhancement layer 103, the display stiffener 113 and the display stack layers 115. According to this example, reflections 714 of the ultrasonic waves 713 are caused by acoustic impedance contrast at (or near) the interface 715 between the outer surface of the cover 718 and whatever is in contact with the outer surface, which may be air or the surface of a target object, such as the ridges and valleys of a fingerprint, etc. (As used herein, the term "finger" may refer to any digit, including a thumb. Accordingly, a thumbprint will be considered a type of "fingerprint.")

According to some examples, reflections 714 of the ultrasonic wave(s) 713 may be detected by the array of sensor pixels 706. Corresponding ultrasonic signals may be provided to the control system 106. In some such implementations, ultrasonic signals that are used by the control system 106 for fingerprint-based authentication may be based on reflections 714 from a cover/finger interface that are detected by the array of sensor pixels 706. In some implementations, reflections 714 corresponding to a cover/air interface may be detected by the electrode layer 210 and corresponding background ultrasonic signals may be provided to the control system 106.

FIG. 8 is a flow diagram that provides examples of operations according to some disclosed methods. The blocks of FIG. 8 may, for example, be performed by the apparatus 100 of FIG. 1 (e.g., by the control system 106 and the ultrasonic sensor stack 105), or by a similar apparatus that includes a frequency-differentiating layer. As with other methods disclosed herein, the method outlined in FIG. 8 may include more or fewer blocks than indicated. Moreover, the blocks of methods disclosed herein are not necessarily performed in the order indicated. In some instances, one or more blocks may be performed concurrently.

In this example, block 805 involves controlling, via a control system (e.g., via the control system 106) an ultrasonic transceiver layer of an ultrasonic sensor system (e.g., the ultrasonic transceiver layer 101) to transmit ultrasonic waves (e.g., the ultrasonic waves 713 shown in FIG. 7) through at least a first resonator configured for causing a first local maximum of ultrasonic wave transmission in a first ultrasonic frequency range and a second resonator configured for causing a second local maximum of ultrasonic wave transmission in the first ultrasonic frequency range. According to this example, the first resonator includes a display stiffener layer (such as the display stiffener 113) and a transmission enhancement layer (such as the transmission enhancement layer 103). In some examples, the first resonator may include a TFT layer.

The first resonator is an example of what may be referred to herein as a transmission enhancement resonator. In some examples, the first resonator may have a thickness corresponding to a multiple of a half wavelength of a shear wave or a longitudinal wave having a frequency in the first ultrasonic frequency range. In some instances, the first ultrasonic frequency range may be the range from 5 MHz to 15 MHz. In some examples, the first ultrasonic frequency range may be the range from 1 MHz to 20 MHz.

In this implementation, the second resonator includes one or more display stack layers. In some instances, the second resonator may be the resonator 250a or the resonator 250c described above.

According to this implementation, block 810 involves receiving, by the control system and from the ultrasonic sensor system, ultrasonic sensor signals corresponding to reflections of transmitted ultrasonic waves from a portion of a target object positioned on an outer surface of an apparatus that includes the ultrasonic sensor system. According to some examples, the ultrasonic sensor signals may correspond to reflections from an interior of the portion of the target object. If the target object is a finger, the first signals may correspond to reflections of the first ultrasonic wave(s) from a subsurface of the finger, e.g., of reflections from one or more sub-epidermal features. Alternatively, or additionally, the ultrasonic sensor signals may correspond to reflections of the transmitted ultrasonic waves from a surface of the portion of the target object. If the target object is a finger, the ultrasonic sensor signals may correspond to reflections of the second ultrasonic wave(s) from a surface of the finger, e.g., from ridges and valleys of a fingerprint.

According to this implementation, block 815 involves performing, by the control system, an authentication process that is based, at least in part, on the ultrasonic sensor signals.

In some implementations, method 800 may involve controlling access to the apparatus, or to another device, based at least in part on the authentication process.

According to some implementations, block 815 may involve obtaining fingerprint data based on portions of the ultrasonic sensor signals received within a time interval corresponding with fingerprints. The time interval may, for example, be measured relative to a time at which the ultrasonic waves were transmitted. Obtaining the fingerprint data may, for example, involve extracting target object features from the ultrasonic sensor signals. The target object features may, for example, comprise fingerprint features. According to some examples, the fingerprint features may include fingerprint minutiae, keypoints and/or sweat pores. In some examples, the fingerprint features may include ridge ending information, ridge bifurcation information, short ridge information, ridge flow information, island information, spur information, delta information, core information, etc.

In some examples, block 815 may involve comparing the fingerprint features with fingerprint features of an authorized user. The fingerprint features of the authorized user may, for example, have been received during a previous enrollment process.

In some implementations, block 815 may involve extracting sub-epidermal features from the ultrasonic sensor signals. Sub-epidermal features of the authorized user may, for example, have been received during a previous enrollment process. According to some implementations, the authentication process may involve comparing sub-epidermal features extracted from the ultrasonic sensor signals with sub-epidermal features of the authorized user.

In some such implementations, the sub-epidermal features may include sub-epidermal layer information corresponding to reflections of the ultrasonic waves received from the portion of the target object within a time interval corresponding with a sub-epidermal region. The sub-epidermal features may, for example, include dermis layer information corresponding to reflections of the second ultrasonic wave received from the portion of the target object. The dermis layer information may have been obtained within a time interval corresponding with a dermis layer. The authentication process may be based, at least in part, on the dermis layer information. Alternatively, or additionally, the sub-epidermal features may include information regarding other sub-epidermal layers, such as the papillary layer, the reticular layer, the subcutis, etc., any blood vessels, lymph vessels, sweat glands, hair follicles, hair papilla, fat lobules, etc., that may be present within such tissue layers, muscle tissue, bone material, etc.

Figure 9:
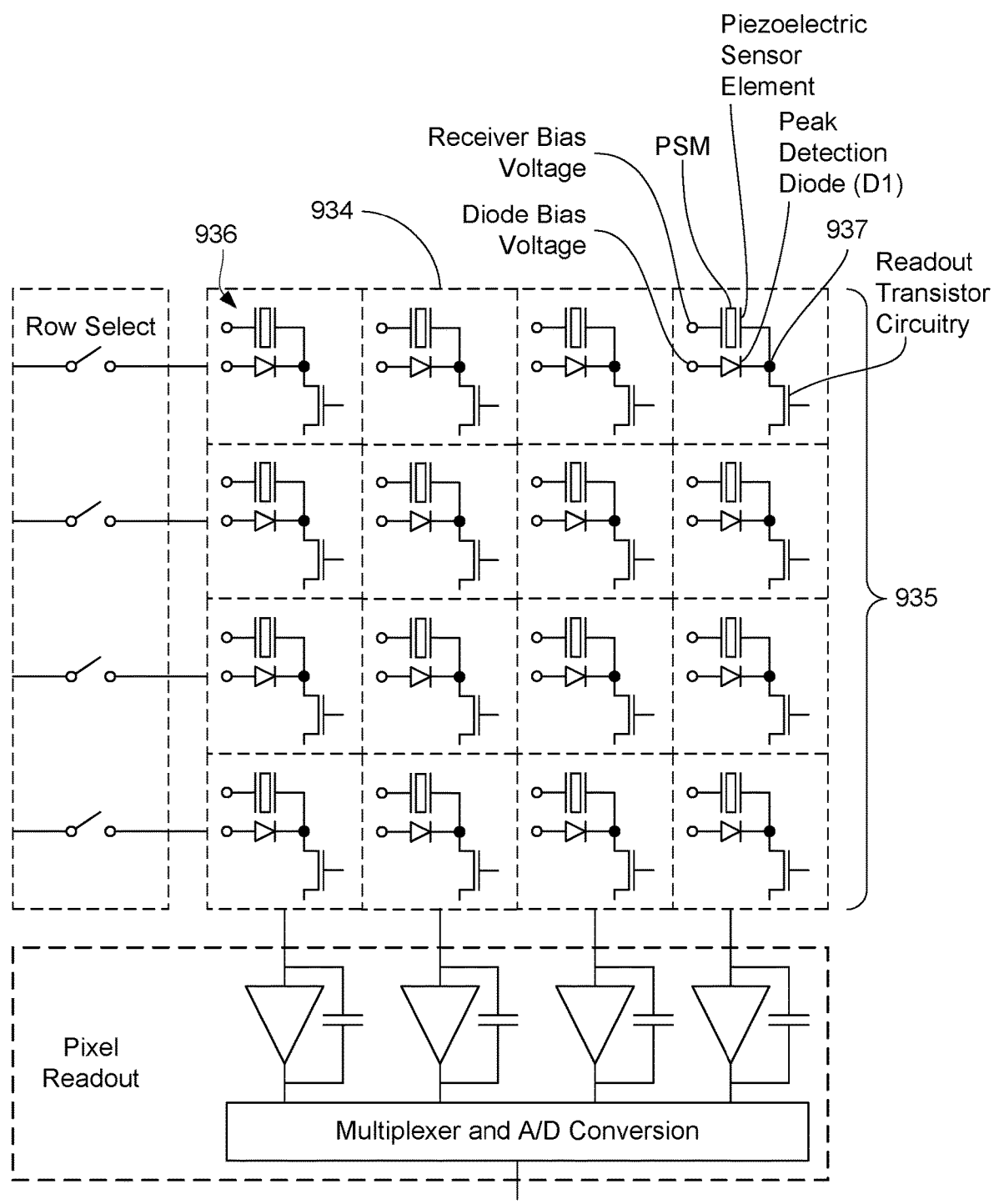
FIG. 9 representationally depicts aspects of a 4×4 pixel array of sensor pixels for an ultrasonic sensor system.

FIG. 9 representationally depicts aspects of a 4×4 pixel array of sensor pixels for an ultrasonic sensor system. Each pixel 934 may be, for example, associated with a local region of piezoelectric sensor material (PSM), a peak detection diode (D1) and a readout transistor (M3); many or all of these elements may be formed on or in a substrate to form the pixel circuit 936. In practice, the local region of piezoelectric sensor material of each pixel 934 may transduce received ultrasonic energy into electrical charges. The peak detection diode D1 may register the maximum amount of charge detected by the local region of piezoelectric sensor material PSM. Each row of the pixel array 935 may then be scanned, e.g., through a row select mechanism, a gate driver, or a shift register, and the readout transistor M3 for each column may be triggered to allow the magnitude of the peak charge for each pixel 934 to be read by additional circuitry, e.g., a multiplexer and an A/D converter. The pixel circuit

936 may include one or more TFTs to allow gating, addressing, and resetting of the pixel 934.

Each pixel circuit 936 may provide information about a small portion of the object detected by the ultrasonic sensor system. While, for convenience of illustration, the example shown in FIG. 9 is of a relatively coarse resolution, ultrasonic sensors having a resolution on the order of 500 pixels per inch or higher may be configured with an appropriately scaled structure. The detection area of the ultrasonic sensor system may be selected depending on the intended object of detection. For example, the detection area may range from about 5 mm×5 mm for a single finger to about 3 inches×3 inches for four fingers. Smaller and larger areas, including square, rectangular and non-rectangular geometries, may be used as appropriate for the target object.

Implementation examples are described in the following numbered clauses:

1. An apparatus, comprising: an ultrasonic sensor stack; a foldable display stack, comprising a display stiffener and display stack layers configured to cause ultrasonic waves transmitted by the ultrasonic sensor stack to have one or more display stack-induced local amplitude maxima in a first ultrasonic frequency range; and a transmission enhancement layer, wherein the display stiffener and the transmission enhancement layer comprise a transmission enhancement resonator configured to cause the ultrasonic waves transmitted by the ultrasonic sensor stack to have a transmission enhancement resonator-induced local amplitude maximum in the first ultrasonic frequency range.

2. The apparatus of clause 1, wherein the transmission enhancement resonator has a thickness corresponding to a multiple of a half wavelength of a shear wave or a longitudinal wave having a frequency in the first ultrasonic frequency range.

3. The apparatus of clause 1 or clause 2, wherein the display stack layers include one or more display stack resonators and wherein the one or more display stack resonators are configured to cause the one or more display stack-induced local amplitude maxima.

4. The apparatus of clause 3, wherein the one or more display stack resonators includes a first resonator bounded by the display stiffener and a glass layer of the foldable display stack.

5. The apparatus of clause 4, wherein the first resonator includes a plurality of layers of an organic light-emitting diode display.

6. The apparatus of clause 4 or clause 5, wherein the one or more display stack resonators includes a second resonator bounded by the glass layer and an outer surface of the foldable display stack.

7. The apparatus of any one of clauses 1-6, wherein the transmission enhancement resonator-induced local amplitude maximum corresponds to a frequency in a range from 5 MHz to 15 MHz.

8. The apparatus of any one of clauses 1-7, further comprising a control system configured to cause the ultrasonic sensor stack to transmit first ultrasonic waves in the first ultrasonic frequency range and to perform an authentication process based, at least in part, on ultrasonic sensor signals corresponding to reflections of the first ultrasonic waves.

9. The apparatus of any one of clauses 1-8, wherein the transmission enhancement layer resides between the ultrasonic sensor stack and the display stiffener.

10. The apparatus of any one of clauses 1-9, wherein the transmission enhancement layer has a thickness of less than a quarter wavelength of a shear wave or a longitudinal wave having a frequency in the first ultrasonic frequency range.

11. The apparatus of any one of clauses 1-10, wherein the transmission enhancement layer comprises an aluminum layer having an aluminum layer thickness in a range from 50 microns to 100 microns, a copper layer having a copper layer thickness in a range from 25 microns to 50 microns or a stainless steel layer having a stainless steel layer thickness in the range from 25 microns to 50 microns.

12. The apparatus of any one of clauses 1-11, further comprising a first adhesive layer residing between the transmission enhancement layer and the display stiffener and a second adhesive layer residing between the transmission enhancement layer and the ultrasonic sensor stack.

13. The apparatus of clause 12, wherein at least one of the first adhesive layer or the second adhesive layer has a thickness in a range from 3 microns to 10 microns.

14. The apparatus of any one of clauses 1-13, wherein the ultrasonic sensor stack includes a thin-film transistor (TFT) substrate and wherein the transmission enhancement resonator includes the TFT substrate.

15. The apparatus of clause 14, wherein the TFT substrate has a thickness of less than a quarter wavelength of a shear wave or a longitudinal wave having a frequency in the first ultrasonic frequency range.

16. The apparatus of clause 14 or clause 15, wherein the TFT substrate has a thickness in a range from 50 microns to 200 microns.

17. The apparatus of any one of clauses 14-16, wherein the TFT substrate comprises glass.

18. The apparatus of any one of clauses 14-17, wherein: the TFT substrate has a first acoustic impedance value; the display stiffener has a second acoustic impedance value that is greater than the first acoustic impedance value; and the transmission enhancement layer has a third acoustic impedance value that is greater than the first acoustic impedance value.

19. The apparatus of any one of clauses 1-18, wherein the display stiffener comprises one or more of a metal layer or a non-metal layer having an acoustic impedance of 10 MRayls or more.

20. The apparatus of any one of clauses 1-19, wherein the display stiffener has a thickness in a range from 30 microns to 300 microns.

21. The apparatus of any one of clauses 1-20, wherein the display stiffener has a thickness corresponding to a multiple of a half wavelength of a shear wave or a longitudinal wave having a frequency in a second ultrasonic frequency range that is higher than the first ultrasonic frequency range.

22. The apparatus of any one of clauses 1-21, wherein the apparatus is a mobile device that includes the ultrasonic sensor stack, the foldable display stack and the transmission enhancement layer.

23. The apparatus of any one of clauses 1-22, wherein the transmission enhancement layer includes at least a portion of the ultrasonic sensor stack.

Further implementation examples are described in the following numbered clauses:

24. An apparatus, comprising: ultrasonic sensor means; a foldable display stack, comprising a display stiffener and one or more display stack resonators configured to enhance ultrasonic waves transmitted by the ultrasonic sensor means in a first ultrasonic frequency range; and a transmission enhancement layer, the display stiffener, the transmission enhancement layer and at least a portion of the ultrasonic sensor means forming a transmission enhancement resonator configured to enhance the ultrasonic waves transmitted by the ultrasonic sensor means in the first ultrasonic frequency range.

25. The apparatus of clause 24, wherein the transmission enhancement resonator has a thickness corresponding to a multiple of a half wavelength of a shear wave or a longitudinal wave having a frequency in the first ultrasonic frequency range.

26. The apparatus of clause 24, wherein enhancing an ultrasonic wave in the first ultrasonic frequency range comprises causing a local maximum of the ultrasonic wave in the first ultrasonic frequency range.

Further implementation examples are described in the following numbered clauses:

27. A method, comprising: controlling, via a control system, an ultrasonic transceiver layer of an ultrasonic sensor system to transmit ultrasonic waves through at least a first resonator configured for causing a first local maximum of ultrasonic wave transmission in a first ultrasonic frequency range and a second resonator configured for causing a second local maximum of ultrasonic wave transmission in the first ultrasonic frequency range, the first resonator including a display stiffener layer and a transmission enhancement layer, the second resonator including one or more display stack layers; receiving, by the control system and from the ultrasonic sensor system, ultrasonic sensor signals corresponding to reflections of transmitted ultrasonic waves from a portion of a target object positioned on an outer surface of an apparatus that includes the ultrasonic sensor system; and performing, by the control system, an authentication process based, at least in part, on the ultrasonic sensor signals.

28. The method of clause 27, wherein the local maximum of ultrasonic wave transmission corresponds to a frequency in a range from 5 MHz to 15 MHz.

29. The method of clause 27, wherein the authentication process involves extracting target object features from the ultrasonic sensor signals.

30. The method of clause 29, wherein the target object features include at least one of fingerprint features or subepidermal features.

31. The method of clause 27, further comprising controlling access to the apparatus based, at least in part, on the authentication process.

As used herein, a phrase referring to "at least one of" a list of items refers to any combination of those items, including single members. As an example, "at least one of: a, b, or c" is intended to cover: a, b, c, a-b, a-c, b-c, and a-b-c.

The various illustrative logics, logical blocks, modules, circuits and algorithm processes described in connection with the implementations disclosed herein may be implemented as electronic hardware, computer software, or combinations of both. The interchangeability of hardware and software has been described generally, in terms of functionality, and illustrated in the various illustrative components, blocks, modules, circuits and processes described above. Whether such functionality is implemented in hardware or software depends upon the particular application and design constraints imposed on the overall system.

The hardware and data processing apparatus used to implement the various illustrative logics, logical blocks, modules and circuits described in connection with the aspects disclosed herein may be implemented or performed with a general purpose single- or multi-chip processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, or, any conventional processor, controller, microcontroller, or state machine. A processor also may be implemented as a combination of computing devices, e.g., a combination of a DSP and a microprocessor, a plurality of microprocessors, one or more microprocessors in conjunction with a DSP core, or any other such configuration. In some implementations, particular processes and methods may be performed by circuitry that is specific to a given function.

In one or more aspects, the functions described may be implemented in hardware, digital electronic circuitry, computer software, firmware, including the structures disclosed in this specification and their structural equivalents thereof, or in any combination thereof. Implementations of the subject matter described in this specification also may be implemented as one or more computer programs, i.e., one or more modules of computer program instructions, encoded on a computer storage media for execution by, or to control the operation of, data processing apparatus.

If implemented in software, the functions may be stored on or transmitted over as one or more instructions or code on a computer-readable medium, such as a non-transitory medium. The processes of a method or algorithm disclosed herein may be implemented in a processor-executable software module which may reside on a computer-readable medium. Computer-readable media include both computer storage media and communication media including any medium that may be enabled to transfer a computer program from one place to another. Storage media may be any available media that may be accessed by a computer. By way of example, and not limitation, non-transitory media may include RAM, ROM, EEPROM, CD-ROM or other optical disk storage, magnetic disk storage or other magnetic storage devices, or any other medium that may be used to store desired program code in the form of instructions or data structures and that may be accessed by a computer. Also, any connection may be properly termed a computer-readable medium. Disk and disc, as used herein, includes compact disc (CD), laser disc, optical disc, digital versatile disc (DVD), floppy disk, and Blu-ray disc where disks usually reproduce data magnetically, while discs reproduce data optically with lasers. Combinations of the above should also be included within the scope of computer-readable media. Additionally, the operations of a method or algorithm may reside as one or any combination or set of codes and instructions on a machine readable medium and computer-readable medium, which may be incorporated into a computer program product.

Various modifications to the implementations described in this disclosure may be readily apparent to those having ordinary skill in the art, and the generic principles defined herein may be applied to other implementations without departing from the spirit or scope of this disclosure. Thus, the disclosure is not intended to be limited to the implementations shown herein, but is to be accorded the widest scope consistent with the claims, the principles and the novel features disclosed herein. The word "exemplary" is used exclusively herein, if at all, to mean "serving as an example, instance, or illustration." Any implementation described herein as "exemplary" is not necessarily to be construed as preferred or advantageous over other implementations.

Certain features that are described in this specification in the context of separate implementations also may be implemented in combination in a single implementation. Conversely, various features that are described in the context of a single implementation also may be implemented in multiple implementations separately or in any suitable subcombination. Moreover, although features may be described above as acting in certain combinations and even initially claimed as such, one or more features from a claimed combination may in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems may generally be integrated together in a single software product or packaged into multiple software products. Additionally, other implementations are within the scope of the following claims. In some cases, the actions recited in the claims may be performed in a different order and still achieve desirable results.

It will be understood that unless features in any of the particular described implementations are expressly identified as incompatible with one another or the surrounding context implies that they are mutually exclusive and not readily combinable in a complementary and/or supportive sense, the totality of this disclosure contemplates and envisions that specific features of those complementary implementations may be selectively combined to provide one or more comprehensive, but slightly different, technical solutions. It will therefore be further appreciated that the above description has been given by way of example only and that modifications in detail may be made within the scope of this disclosure.

The invention claimed is:

1. An apparatus, comprising:
   an ultrasonic sensor stack;
   a foldable display stack, comprising:
      a display stiffener; and
      display stack layers configured to cause ultrasonic waves transmitted by the ultrasonic sensor stack to have one or more display stack-induced local amplitude maxima in a first ultrasonic frequency range; and
   a transmission enhancement layer, wherein the display stiffener and the transmission enhancement layer comprise a transmission enhancement resonator configured to cause the ultrasonic waves transmitted by the ultrasonic sensor stack to have a transmission enhancement resonator-induced local amplitude maximum in the first ultrasonic frequency range.

2. The apparatus of claim 1, wherein the transmission enhancement resonator has a thickness corresponding to a multiple of a half wavelength of a shear wave or a longitudinal wave having a frequency in the first ultrasonic frequency range.

3. The apparatus of claim 1, wherein the display stack layers include one or more display stack resonators and wherein the one or more display stack resonators are configured to cause the one or more display stack-induced local amplitude maxima.

4. The apparatus of claim 3, wherein the one or more display stack resonators includes a first resonator bounded by the display stiffener and a glass layer of the foldable display stack.

5. The apparatus of claim 4, wherein the first resonator includes a plurality of layers of an organic light-emitting diode display.

6. The apparatus of claim 4, wherein the one or more display stack resonators includes a second resonator bounded by the glass layer and an outer surface of the foldable display stack.

7. The apparatus of claim 1, wherein the transmission enhancement resonator-induced local amplitude maximum corresponds to a frequency in a range from 5 MHz to 15 MHz.

8. The apparatus of claim 1, further comprising a control system configured to cause the ultrasonic sensor stack to transmit first ultrasonic waves in the first ultrasonic frequency range and to perform an authentication process based, at least in part, on ultrasonic sensor signals corresponding to reflections of the first ultrasonic waves.

9. The apparatus of claim 1, wherein the transmission enhancement layer resides between the ultrasonic sensor stack and the display stiffener.

10. The apparatus of claim 1, wherein the transmission enhancement layer has a thickness of less than a quarter wavelength of a shear wave or a longitudinal wave having a frequency in the first ultrasonic frequency range.

11. The apparatus of claim 1, wherein the transmission enhancement layer comprises an aluminum layer having an aluminum layer thickness in a range from 50 microns to 100 microns, a copper layer having a copper layer thickness in a range from 25 microns to 50 microns or a stainless steel layer having a stainless steel layer thickness in the range from 25 microns to 50 microns.

12. The apparatus of claim 1, further comprising a first adhesive layer residing between the transmission enhancement layer and the display stiffener and a second adhesive layer residing between the transmission enhancement layer and the ultrasonic sensor stack.

13. The apparatus of claim 12, wherein at least one of the first adhesive layer or the second adhesive layer has a thickness in a range from 3 microns to 10 microns.

14. The apparatus of claim 1, wherein the ultrasonic sensor stack includes a thin-film transistor (TFT) substrate and wherein the transmission enhancement resonator includes the TFT substrate.

15. The apparatus of claim 14, wherein the TFT substrate has a thickness of less than a quarter wavelength of a shear wave or a longitudinal wave having a frequency in the first ultrasonic frequency range.

16. The apparatus of claim 14, wherein the TFT substrate has a thickness in a range from 50 microns to 200 microns.

17. The apparatus of claim 14, wherein the TFT substrate comprises glass.

18. The apparatus of claim 14, wherein:
   the TFT substrate has a first acoustic impedance value;
   the display stiffener has a second acoustic impedance value that is greater than the first acoustic impedance value; and
   the transmission enhancement layer has a third acoustic impedance value that is greater than the first acoustic impedance value.

19. The apparatus of claim 1, wherein the display stiffener comprises one or more of a metal layer or a non-metal layer having an acoustic impedance of 10 MRayls or more.

20. The apparatus of claim 1, wherein the display stiffener has a thickness in a range from 30 microns to 300 microns.

21. The apparatus of claim 1, wherein the display stiffener has a thickness corresponding to a multiple of a half wavelength of a shear wave or a longitudinal wave having a frequency in a second ultrasonic frequency range that is higher than the first ultrasonic frequency range.

22. The apparatus of claim 1, wherein the apparatus is a mobile device that includes the ultrasonic sensor stack, the foldable display stack and the transmission enhancement layer.

23. The apparatus of claim 1, wherein the transmission enhancement layer includes at least a portion of the ultrasonic sensor stack.

24. An apparatus, comprising:
ultrasonic sensor means;
a foldable display stack, comprising:
 a display stiffener; and
 one or more display stack resonators configured to enhance ultrasonic waves transmitted by the ultrasonic sensor means in a first ultrasonic frequency range; and
a transmission enhancement layer, the display stiffener, the transmission enhancement layer and at least a portion of the ultrasonic sensor means forming a transmission enhancement resonator configured to enhance the ultrasonic waves transmitted by the ultrasonic sensor means in the first ultrasonic frequency range.

25. The apparatus of claim 24, wherein the transmission enhancement resonator has a thickness corresponding to a multiple of a half wavelength of a shear wave or a longitudinal wave having a frequency in the first ultrasonic frequency range.

26. The apparatus of claim 24, wherein enhancing an ultrasonic wave in the first ultrasonic frequency range comprises causing a local maximum of the ultrasonic wave in the first ultrasonic frequency range.

27. A method, comprising:
controlling, via a control system, an ultrasonic transceiver layer of an ultrasonic sensor system to transmit ultrasonic waves through at least a first resonator configured for causing a first local maximum of ultrasonic wave transmission in a first ultrasonic frequency range and a second resonator configured for causing a second local maximum of ultrasonic wave transmission in the first ultrasonic frequency range, the first resonator including a display stiffener layer and a transmission enhancement layer, the second resonator including one or more display stack layers;
receiving, by the control system and from the ultrasonic sensor system, ultrasonic sensor signals corresponding to reflections of transmitted ultrasonic waves from a portion of a target object positioned on an outer surface of an apparatus that includes the ultrasonic sensor system; and
performing, by the control system, an authentication process based, at least in part, on the ultrasonic sensor signals.

28. The method of claim 27, wherein the local maximum of ultrasonic wave transmission corresponds to a frequency in a range from 5 MHz to 15 MHz.

29. The method of claim 27, wherein the authentication process involves extracting target object features from the ultrasonic sensor signals.

30. The method of claim 29, wherein the target object features include at least one of fingerprint features or sub-epidermal features.

31. The method of claim 27, further comprising controlling access to the apparatus based, at least in part, on the authentication process.

* * * * *